United States Patent
Young et al.

(10) Patent No.: US 9,336,519 B2
(45) Date of Patent: May 10, 2016

(54) SYSTEM AND METHOD FOR DETERMINING APPROPRIATE REDEMPTION PRESENTATIONS FOR A VIRTUAL TOKEN ASSOCIATED WITH A STORED VALUE ACCOUNT

(75) Inventors: Frank T. Young, Atlanta, GA (US);
Robert L. Dessert, Atlanta, GA (US);
Ben D. Ackerman, Atlanta, GA (US);
Gwenael B. Delaine, Atlanta, GA (US);
Lindsey K. Dorman, Atlanta, GA (US);
Eric R. Kraar, Atlanta, GA (US); Aidoo Osei, Atlanta, GA (US); Kyle Cochran, Atlanta, GA (US); Steven M. Smith, Atlanta, GA (US)

(73) Assignee: QUALCOM Incorporated, San Diego, CA (US)

( * ) Notice: Subject to any disclaimer, the term of this patent is extended or adjusted under 35 U.S.C. 154(b) by 387 days.

(21) Appl. No.: 12/851,716

(22) Filed: Aug. 6, 2010

(65) Prior Publication Data

US 2011/0218868 A1 Sep. 8, 2011

Related U.S. Application Data

(60) Provisional application No. 61/311,623, filed on Mar. 8, 2010.

(51) Int. Cl.
*G06Q 20/00* (2012.01)
*G06Q 20/32* (2012.01)
(Continued)

(52) U.S. Cl.
CPC .......... *G06Q 20/3274* (2013.01); *G06Q 20/045* (2013.01); *G06Q 20/20* (2013.01); *G06Q 20/32* (2013.01); *G06Q 30/02* (2013.01); *G06Q 30/06* (2013.01); *G06Q 40/02* (2013.01)

(58) Field of Classification Search
CPC ... G06Q 30/02; G06Q 20/20; G06Q 30/0238; G06Q 20/32; G06Q 20/322; G06Q 30/0236; G06Q 30/0261; G06Q 30/0207; G06Q 30/0211; G06Q 30/0212; G06Q 30/0233; G06Q 30/0267; G06Q 20/528; G06Q 30/0229; G06Q 20/3552; G06Q 20/3672; G06Q 30/0601; G07B 15/00
See application file for complete search history.

(56) References Cited

U.S. PATENT DOCUMENTS 6,873,974 B1 3/2005 Schutzer
7,494,055 B2 2/2009 Fernandes et al.
(Continued)

FOREIGN PATENT DOCUMENTS

CN 101657784 A 2/2010
GB 2362012 A 11/2001
(Continued)

OTHER PUBLICATIONS

International Search Report and Written Opinion—PCT/US2011/026276, ISA/EPO—May 18, 2011.
(Continued)

*Primary Examiner* — F. Zeender
*Assistant Examiner* — Dana Amsdell
(74) *Attorney, Agent, or Firm* — Nicholas A. Cole

(57) ABSTRACT

A method for determining an appropriate redemption presentation for a virtual token associated with a stored value account is disclosed. The method may include receiving a request for presenting a redemption presentation of a virtual token and obtaining a merchant identifier associated with the request. The method may further include determining if the request is for one of an on-line transaction and a transaction with a point-of-sale terminal, and if the request is for a transaction with a point-of-sale terminal, then searching a database using the merchant identifier to find one or more redemption presentations of virtual token preferred by a merchant. Subsequently, the one or more redemption presentations of the virtual token may be transmitted over a computer network to a client device.

35 Claims, 22 Drawing Sheets

(51) Int. Cl.
*G06Q 20/04* (2012.01)
*G06Q 20/20* (2012.01)
*G06Q 30/02* (2012.01)
*G06Q 30/06* (2012.01)
*G06Q 40/02* (2012.01)
G06Q 30/00 (2012.01)
G07B 15/00 (2011.01)

(56) References Cited

U.S. PATENT DOCUMENTS

| | | | |
|---|---|---|---|
| 2003/0163787 A1 | 8/2003 | Hay et al. | |
| 2003/0208403 A1* | 11/2003 | Fisher et al. | 705/14 |
| 2003/0233276 A1 | 12/2003 | Pearlman et al. | |
| 2005/0222961 A1* | 10/2005 | Staib | G06Q 20/327 705/64 |
| 2005/0246293 A1 | 11/2005 | Ong | |
| 2006/0144946 A1* | 7/2006 | Kuriyama et al. | 235/462.1 |
| 2007/0244991 A1* | 10/2007 | Dowling | G06Q 20/04 709/218 |
| 2008/0011837 A1* | 1/2008 | Wesley | G06Q 20/20 235/383 |
| 2008/0163257 A1 | 7/2008 | Carlson et al. | |
| 2008/0208681 A1* | 8/2008 | Hammad | G06Q 20/045 705/13 |
| 2008/0208762 A1* | 8/2008 | Arthur et al. | 705/79 |
| 2009/0006144 A1 | 1/2009 | Nakajima | |
| 2009/0065572 A1* | 3/2009 | Jain | 235/379 |
| 2009/0192913 A1 | 7/2009 | Saito et al. | |
| 2010/0125497 A1* | 5/2010 | Arguello | 705/14.33 |
| 2011/0029370 A1* | 2/2011 | Roeding et al. | 705/14.38 |
| 2015/0220908 A1 | 8/2015 | Young et al. | |

FOREIGN PATENT DOCUMENTS

| | | |
|---|---|---|
| JP | H10187828 A | 7/1998 |
| JP | 2001344545 A | 12/2001 |
| JP | 2004102883 A | 4/2004 |
| JP | 2006293511 A | 10/2006 |
| JP | 2008040747 A | 2/2008 |
| JP | 2008146240 A | 6/2008 |
| JP | 2009181224 A | 8/2009 |
| JP | 2010026821 A | 2/2010 |
| KR | 20020065989 A | 8/2002 |
| WO | 0197131 | 12/2001 |
| WO | WO2005083640 A1 | 9/2005 |
| WO | 2006059124 | 6/2006 |
| WO | WO2008028234 A1 | 3/2008 |

OTHER PUBLICATIONS

Tsuboya, T., et al., "The payment cards in the world", World payment card, C-media, Japan, Feb. 10, 2009, First version, pp. 49, and 88 to 91.

* cited by examiner

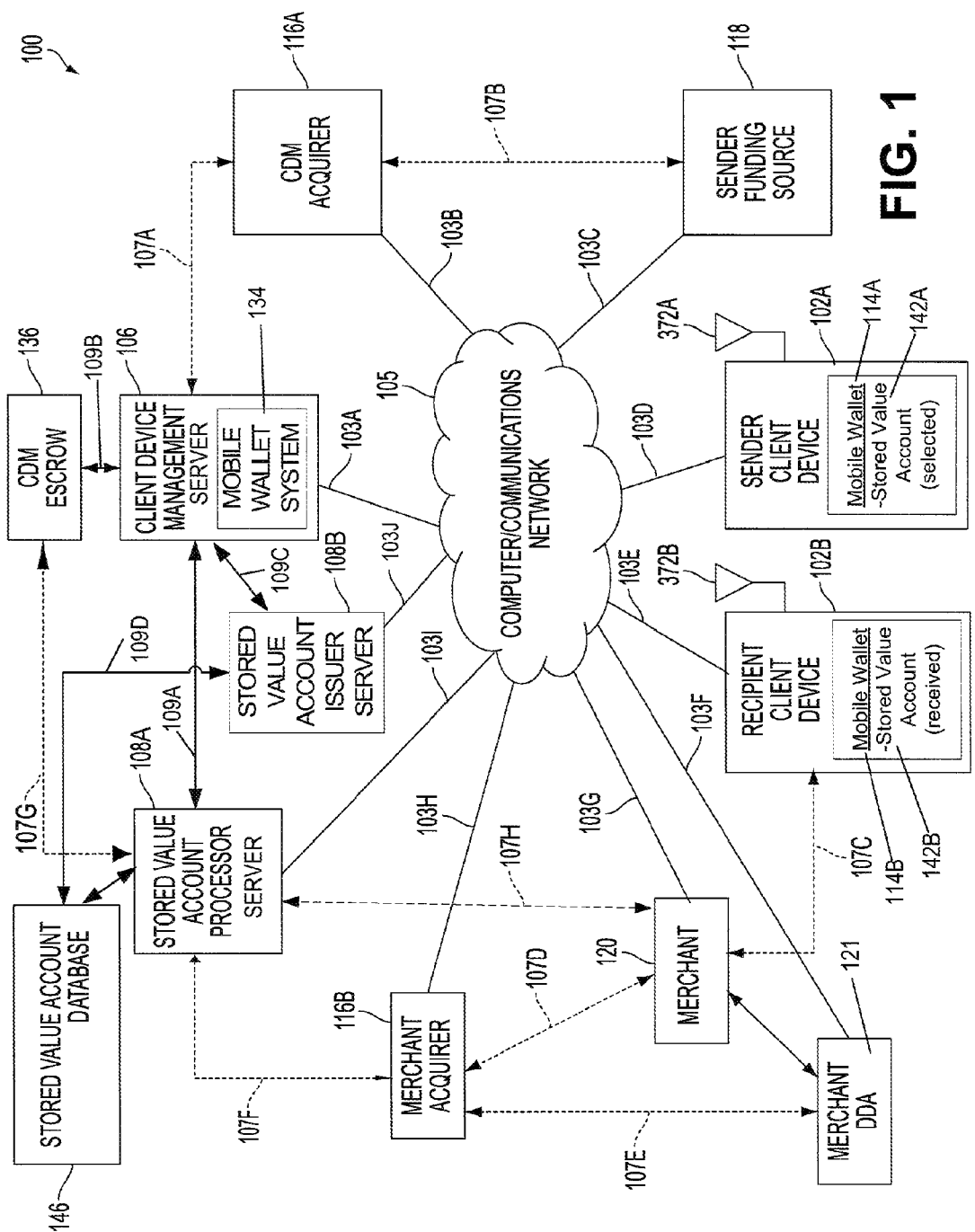

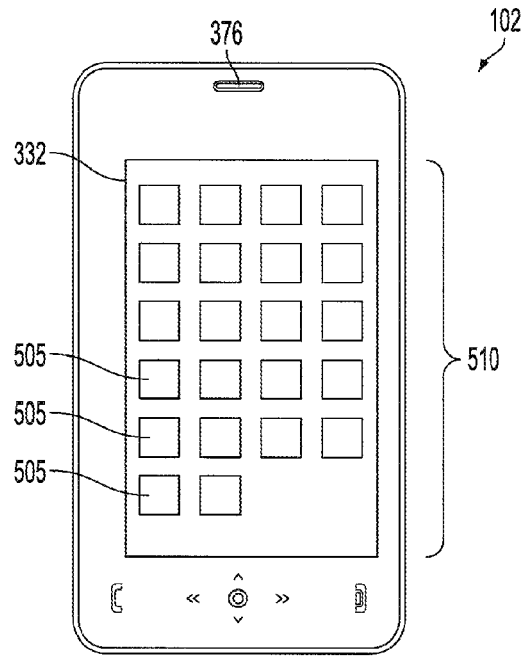
FIG. 5
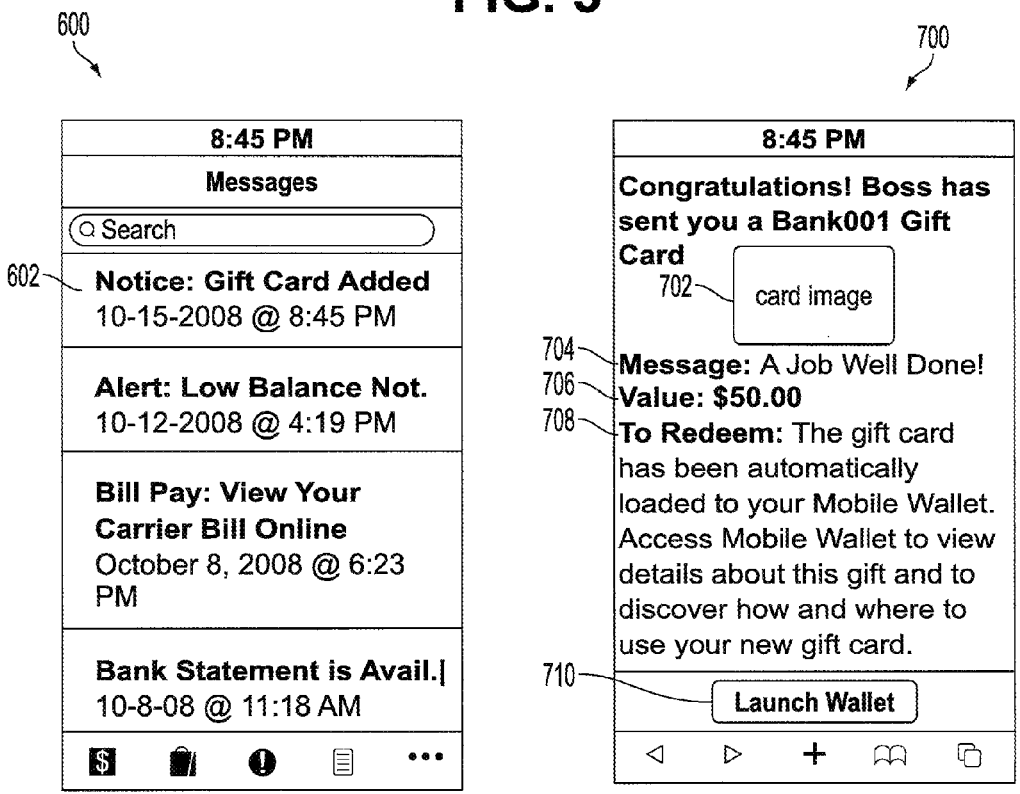
FIG. 6
FIG. 7

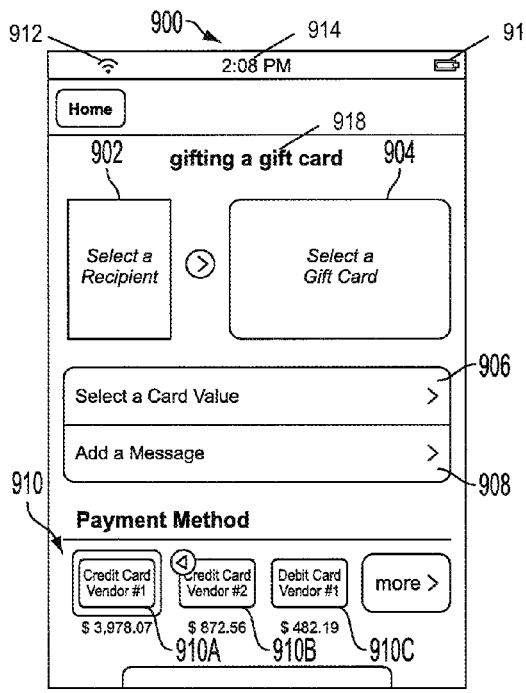
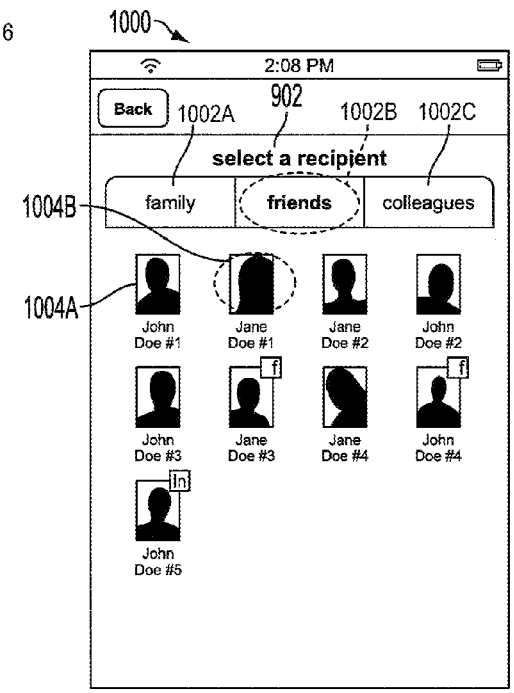
FIG. 9   FIG. 10
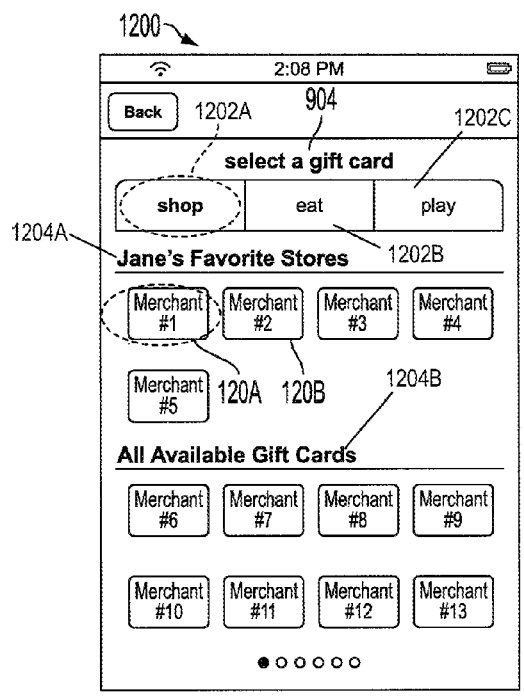
FIG. 11   FIG. 12

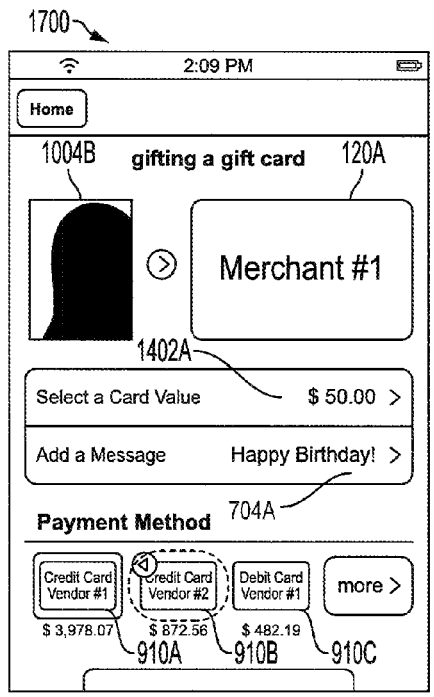
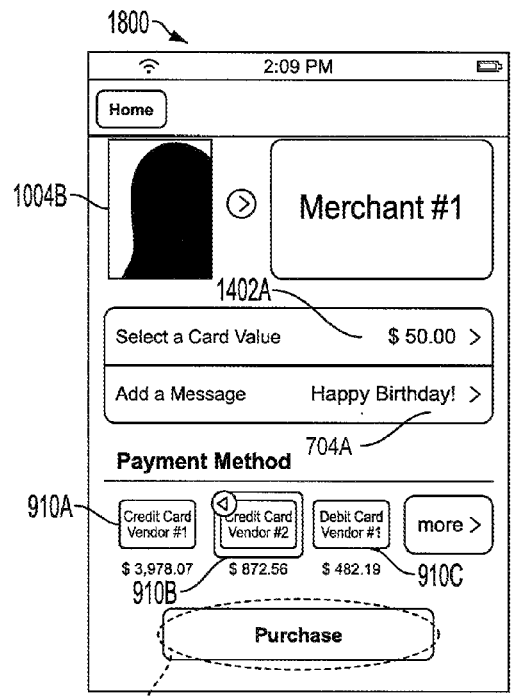
FIG. 17          FIG. 18
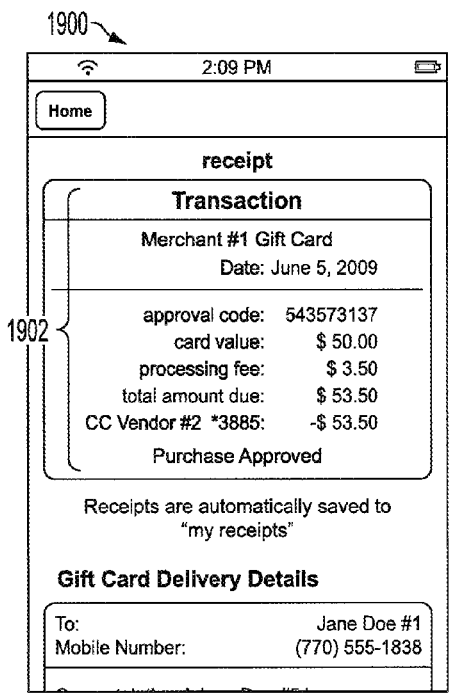
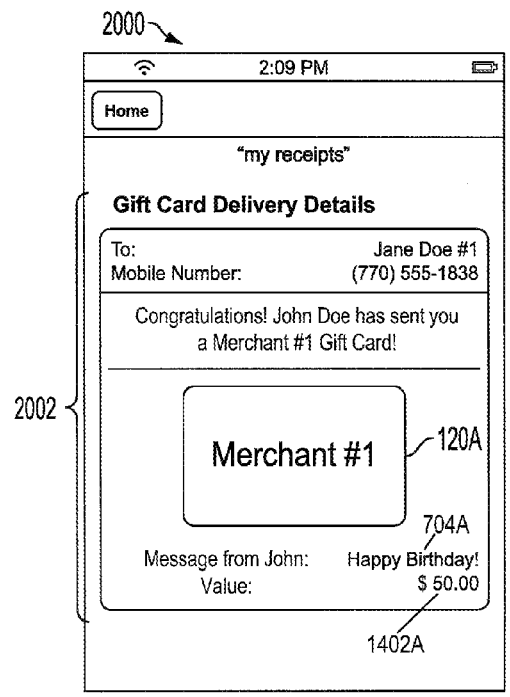
FIG. 19          FIG. 20

SYSTEM AND METHOD FOR DETERMINING APPROPRIATE REDEMPTION PRESENTATIONS FOR A VIRTUAL TOKEN ASSOCIATED WITH A STORED VALUE ACCOUNT

CROSS-REFERENCE AND PRIORITY CLAIM TO RELATED APPLICATION

This patent application claims priority under 35 U.S.C. §119(e) to U.S. Provisional Patent Application Ser. No. 61/311,623, Filed Mar. 8, 2010, entitled, "SYSTEM AND METHOD FOR DETERMINING APPROPRIATE REDEMPTION PRESENTATIONS FOR A VIRTUAL TOKEN ASSOCIATED WITH A STORED VALUE ACCOUNT," the entire contents of which are hereby incorporated by reference.

DESCRIPTION OF THE RELATED ART

Traditionally, physical tokens are issued by providers of stored value accounts. These tokens usually take the form of plastic cards which bear a primary account number associated with a stored value account that may be accessed with the token. One common conventional token is the traditional gift card that may be issued by a merchant. A problem with this conventional token is that a merchant or a service provider associated with the stored value account (e.g., a gift card account) usually does not know the identity of the person who may use the token to redeem its value from the stored value account.

Another problem with conventional physical tokens is that they require space and usually must be carried in some form of carrier, like a wallet or a purse. Physical tokens add to the list of essential items that are carried by most individuals. Other essential items that may be carried by most individuals are mobile computing devices, like mobile phones or personal digital assistants ("PDAs").

What is needed is a system and method of conducting transactions using a virtual, stored value token that may be managed with a mobile client device and which may provide increased flexibility of use of a stored value account by the virtual token holder.

SUMMARY OF THE DISCLOSURE

A method for determining an appropriate redemption presentation for a virtual token associated with a stored value account is disclosed. The method may include receiving a request for presenting a redemption presentation of a virtual token and obtaining a merchant identifier associated with the request. The method may further include determining if the request is for one of an on-line transaction and a transaction with a point-of-sale terminal, and if the request is for a transaction with a point-of-sale terminal, then searching a database using the merchant identifier to find one or more redemption presentations of virtual token preferred by a merchant. Subsequently, the one or more redemption presentations of the virtual token may be transmitted over a computer network.

According to another aspect, a computer system for determining an appropriate redemption presentation for a virtual token associated with a stored value account is also disclosed. The system may include a processor that is operable to: receive a request for presenting a redemption presentation of a virtual token; obtain a merchant identifier associated with the request; and determine if the request is for one of an on-line transaction and a transaction with a point-of-sale terminal. The processor may further be operable to search a database using the merchant identifier to find one or more redemption presentations of virtual token preferred by a merchant if the request is for a transaction with a point-of-sale terminal. The processor may further be operable to transmit the one or more redemption presentations of the virtual token over a computer network.

In another aspect, a computer system for determining an appropriate redemption presentation for a virtual token associated with a stored value account is disclosed. The system may include means for receiving a request for presenting a redemption presentation of a virtual token and means for obtaining a merchant identifier associated with the request. The system may also include means for determining if the request is for one of an on-line transaction and a transaction with a point-of-sale terminal and means for searching a database using the merchant identifier to find one or more redemption presentations of virtual token preferred by a merchant if the request is for a transaction with a point-of-sale terminal. The system may also include means for transmitting the one or more redemption presentations of the virtual token over a computer network.

According to an additional aspect, a computer program product is described that includes a computer usable medium having a computer readable program code embodied therein, in which the computer readable program code adapted to be executed implements a method for determining an appropriate redemption presentation for a virtual token associated with a stored value account. The computer readable program code may implement a method that includes receiving a request for presenting a redemption presentation of a virtual token; obtaining a merchant identifier associated with the request; and determining if the request is for one of an on-line transaction and a transaction with a point-of-sale terminal. The method may further include determining if the request is for a transaction with a point-of-sale terminal, then searching a database using the merchant identifier to find one or more redemption presentations of virtual token preferred by a merchant. The method may also include transmitting the one or more redemption presentations of the virtual token over a computer network.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all Figures.

FIG. 1 is a diagram of a first aspect of a system for creating and managing a stored value account associated with a client device;

FIG. 5 is a diagram of a touch screen for a mobile client device;

FIG. 6 is a diagram of a messages screen;

FIG. 7 is a diagram of a detailed message screen;

FIG. 9 is a diagram of a screen for introducing a stored value account purchase option;

FIG. 10 is a diagram of a screen for displaying available databases that may be used to select a recipient of a stored value account;

FIG. 11 is a diagram of a screen for displaying a confirmation of the recipient selected in the screen of FIG. 10;

FIG. 12 is a diagram of a screen for displaying options for the types of merchants that may be selected for a stored value account;

FIG. 17 is a diagram of a screen for displaying a confirmation of the message selected in the screen of FIG. 16 by a user of the client device;

FIG. 18 is a diagram of a screen for displaying a confirmation of the payment method selected in the screen of FIG. 17 by a user of the client device;

FIG. 19 is a diagram of a screen for displaying a receipt of the purchased stored value account which was selected by the user of the client device;

FIG. 20 is a diagram of a screen for displaying a displaying a stored value token that has been received by a user of a client device;

DETAILED DESCRIPTION

Figure 2A:
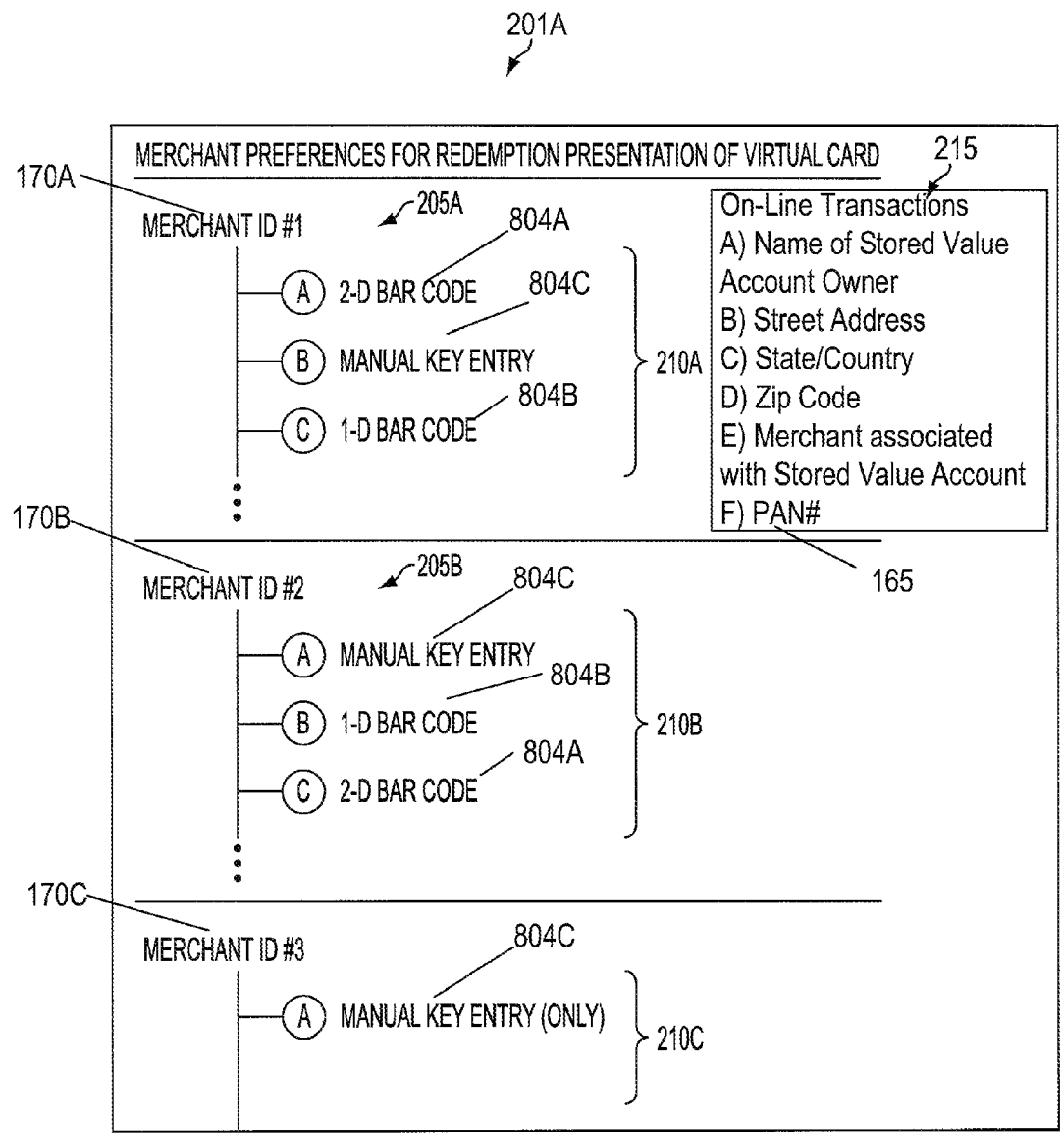
FIG. 2A is a diagram of a first data structure for a mobile wallet system database managed by the client device management server illustrated in FIG. 1.

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

In this description, the terms "communication device," "wireless device," "wireless telephone," "wireless communication device," and "wireless handset" are used interchangeably. With the advent of third generation ("3G") wireless technology, greater bandwidth availability has enabled more electronic devices with a greater variety of wireless capabilities. Therefore, a wireless device could be a cellular telephone, a pager, a PDA, a smartphone, a navigation device, or a computer with a wireless connection.

Referring to FIG. 1, this figure is a diagram of a first aspect of a system 100 for determining appropriate redemption presentations for a virtual token associated with a stored value account 142 that may be accessed with a client device 102. Stored value accounts 142 may include gift card accounts available as of this writing from various merchants 120. Stored value accounts 142 cover and may include, but are not limited to, payroll cards, government benefit cards, prepaid debit cards, and telephone cards.

There are usually two main categories of stored value accounts 142: (a) single-purpose or "closed-loop" accounts and (b) "open-loop" accounts. Gift cards, which can only be used to purchase goods at particular retailers, and prepaid telephone cards, which can only be used to make telephone calls, are examples of single-purpose stored value accounts 142.

The second type of account 142 is a multipurpose or "open-loop" stored value account 142, which can be used to make debit transactions at a wide variety of retail locations (not limited to a single retailer), as well as for other purposes, such as receiving direct deposits and withdrawing cash from ATMs. Some multipurpose accounts may be a branded credit card network, like VISA™ or MASTERCARD™ brand networks, and can be used wherever those brands are accepted. The stored value account 142 of this disclosure covers both open-loop and closed-loop types.

The system 100 may include a client device management server 106, a stored value account processor server 108A, a stored value account issuer server 108B, a merchant acquirer 116B, a client device management ("CDM") acquirer 116A, a sender funding source 118, client devices 102, and a merchant 120.

Many of the system elements illustrated in FIG. 1 are coupled via communications links 103A-J to a computer or communications network 105. The links 103 illustrated in FIG. 1 may be wired or wireless links Wireless links include, but are not limited to, radio-frequency ("RF") links, infrared links, acoustic links, and other wireless mediums. The communications network 105 may comprise a wide area network ("WAN"), a local area network ("LAN"), the Internet, a Public Switched Telephony Network ("PSTN"), a paging network, or a combination thereof Many of the system elements illustrated in FIG. 1 are also shown to be coupled by virtual links 107A-H illustrated with dashed lines. The virtual links 107 depict direct communications between elements when, in fact, the actual communications are supported by the communications links 103 that couple a respective element to the communications network 105. The virtual links 107 are shown for exemplary purposes and for understanding the flow of communications between and among respective elements in the system 100.

The client device management server 106 may support a mobile wallet system 134 which is responsible for managing and maintaining mobile wallets 114 that are stored in memory by the sender client device 102A and the recipient client device 102B. Each client device 102 is shown to have an antenna 372 so that a respective client device may establish wireless communication links 103 with the communications network 105. However, client devices 102 which have wired or hard line links 103 to the communications network 105, such as laptop or handheld computers, are included within the scope of the invention.

The client device management server 106 may communicate with the sender client device 102A in order to establish a stored value account 142 that may be created and sent to a mobile wallet 114B of a recipient client device 102B. The client device management server 106 also works with the stored value account processor server 108A and the stored value account issuer server 108B in order to manage transactions associated with the stored value accounts 142. The stored value account processor server 108A may work directly with a merchant acquirer 116B that also works with a merchant 120. In some instances, a merchant 120 may work directly with the stored value account processor server 108A without sending communications through or receiving communications from a merchant acquirer 116B.

While a stored value account 142A is illustrated as associated with the sender client device 102A, it is recognized that the user of the sender client device 102A does not need to have a stored value account 142A in order to send or create one for the recipient client device 102B. Therefore, the stored value account 142A in connection with the sender client device 102A may be eliminated or it may not be created without departing from the scope of the invention.

The stored value account issuer server 108B may be responsible for establishing/creating the stored value accounts 142 managed and held in the stored value account database 146. Specifically, the stored value account issuer server 108B is responsible for creating and managing the client unique identifiers 155, virtual card identification numbers 167, primary account numbers ("PANs") 165, and merchant identifiers 170 of FIG. 2 discussed in greater detail below. While the stored value account issuer server 108B and stored value account processor 108A have been illustrated in FIG. 1 as separate elements, one of ordinary skill in the art recognizes that a single computer server could perform the functions of these two elements. With this in mind, the remaining disclosure, on occasion, may refer to the stored value account processor server 108A and stored value account issuer server 108B as a single hardware/software element.

The merchant 120 may accept and process stored value accounts 142 in exchange for goods and services. The client device management server 106 may communicate with a client device management ("CDM") acquirer 116A. The CDM acquirer 116A communicates with a sender funding source 118. The sender funding source 118 may comprise a financial institution that maintains a contractual relationship with a merchant 120 or the client device management server 106.

An acquirer 116 typically acts as a "middleman:" an acquirer 116 typically receives credit card transactions from a merchant 120 (or the client device management system 106) and then settles those transactions with an issuing financial institution, such as a bank. An acquirer 116 may deposit funds into a depository bank account, such as the client device management ("CDM") escrow account 136 or the merchant demand deposit account ("DDA") 121, and recoup those funds from a credit card issuer, or other entity. Funds from a merchant demand deposit account ("DDA") 121 may be accessed by check, debit card, or an automated clearinghouse as known to one of ordinary skill in the art. A DDA 121 may comprise a checking account, or other draft account. Usually, the merchant 120 or operator of the client device management server 106 must pay certain fees to an acquirer 116 for handling credit card type transactions, as is known to one of ordinary skill in the art.

The sender funding source 118 may comprise a financial institution, such as a bank, that is associated with a user of the sender client device 102A. The sender funding source 118 may be accessed by the sender client device 102A to purchase a stored value account 142 for the recipient client device 102B. The stored value account 142 may be managed and serviced by the stored value account processor server 108A and stored value account issuer server 108B which receive all of their client device communications from the client device management server 106.

The stored value account processor server 108A and the stored value account issuer server 108B may maintain a database 146 of stored value accounts 142 that may be associated with a plurality of client devices 102. The stored value account processor server 108A may also communicate with merchant acquirers 116B or merchants 120 directly in order to process any request from a client device 102 to a merchant 120 for redeeming a value of a stored value account at a point of sale ("POS") terminal or in a virtual store environment present on a computer/communications network 105.

According to an exemplary embodiment, a sender client device 102A may create, personalize, and send a stored value account 142, represented by a virtual token 702 (FIG. 7) rendered on a display device, to a recipient client device 102B by interacting and working with the client device management server 106. The client device management server 106 may process the request and corresponding payment for establishing the stored value account(s) 142 which are sent to the recipient client device 102B.

Once the one or more stored value accounts 142 are received by a recipient client device 102B and activated by the recipient client device 102B, the recipient client device 102B may redeem the stored value accounts 142 for value, such as for goods and/or services at a merchant 120, like at a brick-and-mortar store location, or through a virtual shopping cart over a computer/communications network 105.

The system 100 may provide certain advantages when the client device 102 comprises a mobile wireless device such as a mobile telephone so that a merchant 120 may be provided with geographical coordinates of the recipient client device 102B as well as the identity of the user of the client device 102B by the client device management server 106. In this way, by knowing the identity of the recipient client device 102B and the geographical coordinates of the recipient client device 102B, the merchant 120 may be able to send offers or promotions to the recipient client device 102. In this manner, offers or promotions that are unique to a particular merchant 120 may be specifically targeted to a recipient 102B.

Referring to FIG. 2A, this figure is a diagram of a first data structure 201A for a mobile wallet system database 134 managed by client device management server 106 illustrated in FIG. 1. The data structure 201A may comprise merchant preferences for redemption presentations of a virtual token 702 for use with point-of-sale ("POS") terminals, which may include devices such as a bar code reader. Specifically, the data structure 201A may comprise an alphanumeric merchant identifier 170 and a listing 210A of POS terminal preferences. The merchant identifier 170 allows the mobile wallet system 134 to organize and track POS preferences according to those specified by a particular merchant 120.

For example, the first merchant 120 having the first merchant identifier 170A may indicate to the client device management server 106 that it has store locations that have at least three types of POS terminals, such as POS terminals that can process two dimensional bar codes 804A, manual key entries 804C, and one dimensional bar codes 804B. The listing 210A may have a predetermined priority meaning that the listing 210A should be accessed in the sequence listed. However, one of ordinary skill the art recognizes that the listing does not need to be accessed in sequence in other exemplary embodiments.

Figure 8A:
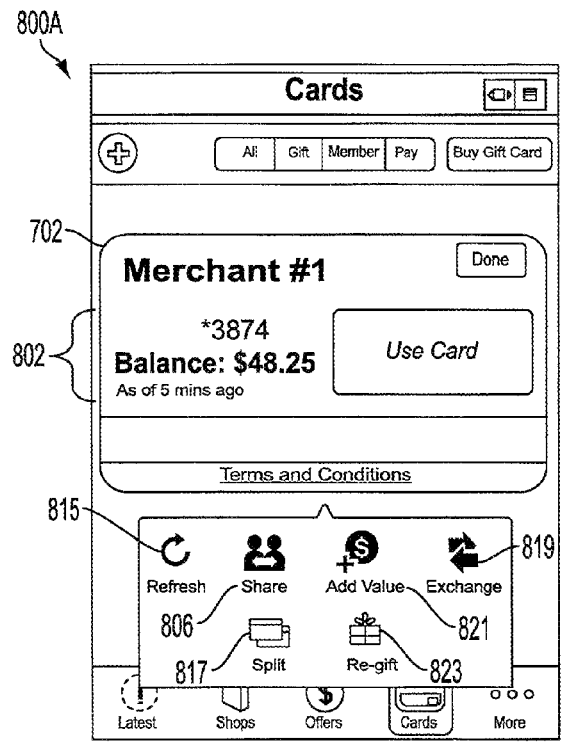
FIG. 8A is a diagram of a screen listing options for managing a stored value account.

The listing 210A of POS terminal preferences allows the mobile wallet system 134 to determine the most appropriate redemption presentation of a virtual token 702 when a user of a client device 102B desires to make a purchase using a stored valued account which is tracked by the mobile wallet system 134. So this means, according to the exemplary embodiment illustrated in FIG. 2A, when a user of a recipient client device 102B desires to make a purchase in a store owned by the first merchant 120 having the first merchant identifier 170A, the mobile wallet system 134 will access the database 201A to determine what is the preferred redemption presentation format of a virtual token 702 that should be displayed on a mobile client device 102B. In the exemplary embodiment illustrated in FIG. 2A, the first merchant 120 having the first merchant identifier 170A has a preference for two dimensional bar codes 804A as indicated by the first entry in the listing 210A. This preference for two dimensional bar codes 804A would cause the mobile wallet system 134 to instruct the mobile client device 102B to present a two dimensional bar code 804A for redemption when the mobile client device 102B is presented to a POS terminal, such as a bar code reader. A two dimensional bar code 804A is illustrated in FIG. 8A and is discussed in further detail below.

Figure 2B:
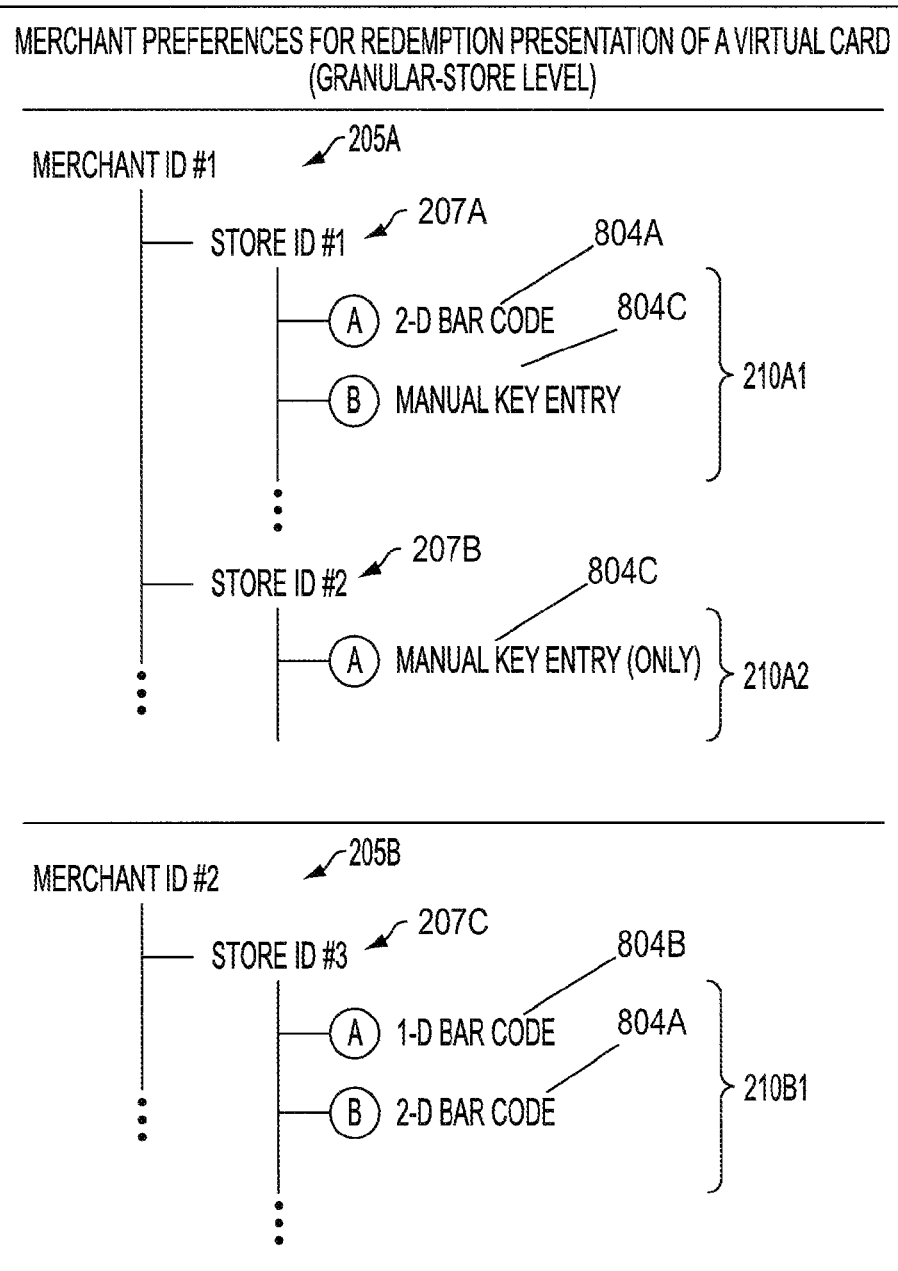
FIG. 2B is a diagram of a second data structure for a mobile wallet system database managed by the client device management server illustrated in FIG. 1.
Figure 2C:
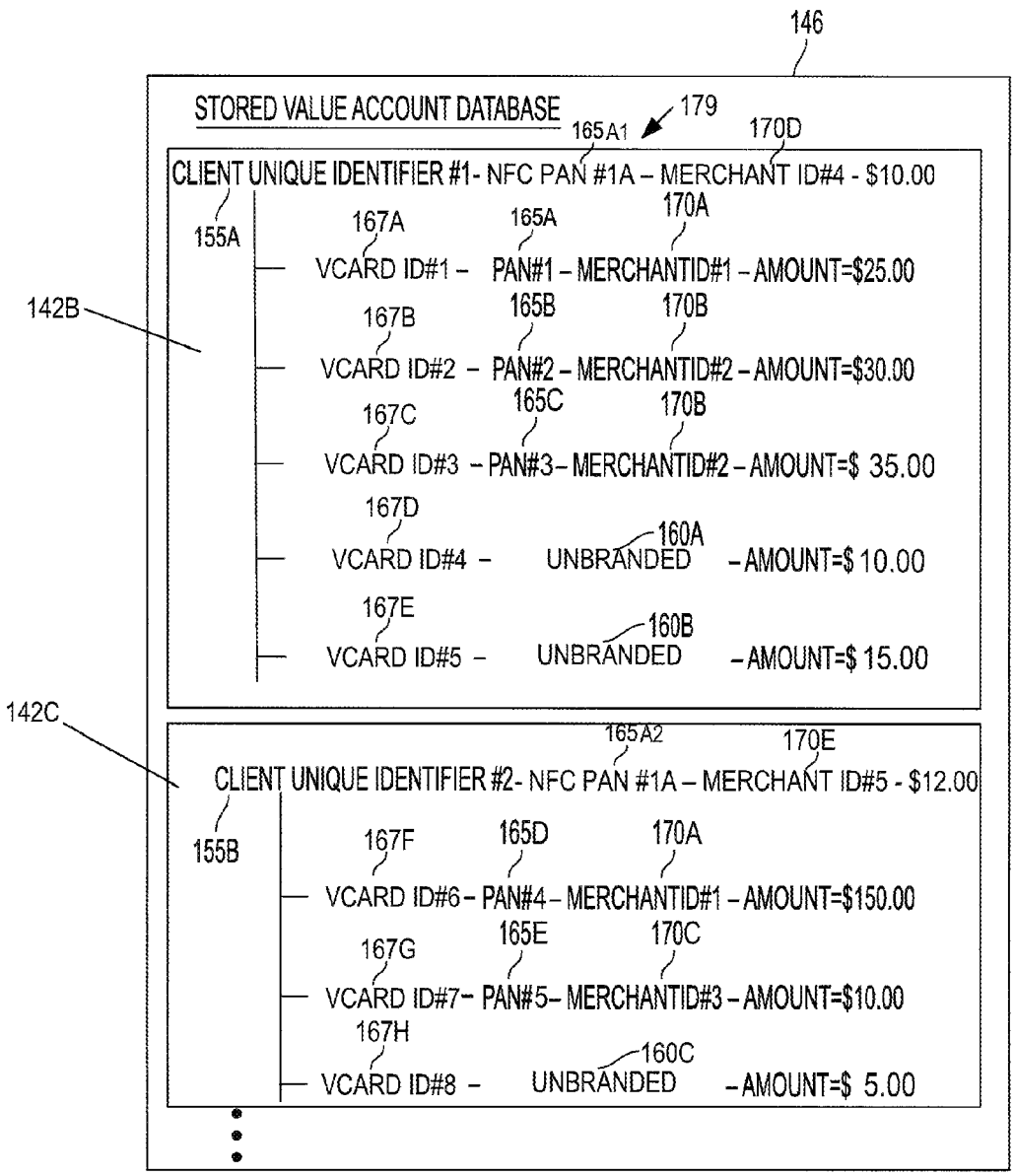
FIG. 2C is a diagram of a data structure for a stored value account database managed by a stored value account processor server illustrated in FIG. 1.

While only three redemption presentation preferences have been described and illustrated, such as the two dimensional bar code 804A, one dimensional bar code 804B, and manual key entry format 804C, one of ordinary skill in the art recognizes that other redemption presentations for virtual cards 702 interfacing with various POS terminals likely exist and are within the scope of the invention. Further, the data structures 201A-B, and 179 described in connection with FIGS. 2A-2C are not limited to those illustrated. One of ordinary skill the art recognizes that modifications to these data structures 201A-B and 179 may be made without departing from the scope of the invention.

The data structure 201A may further comprise a listing 215 of preferences for redemption presentations associated with on-line transactions. The listing 215 would be accessed by the mobile wallet system 134 when the mobile wallet system 134 discovers that the client device 102 is trying to conduct an on-line transaction. The listing 215 of on-line preferences for particular merchant may include, but is not limited to, name information associated with the stored value account 142, street address information, ZIP code information, state information, and the personal account number ("PAN") 165 associated with the stored value account 142.

FIG. 2B is a diagram of a second data structure 201B for a mobile wallet system database managed by client device management server illustrated in FIG. 1. The second data structure 201B illustrated in FIG. 2B shares several elements which are similar to those in the first data structure 201A illustrated in FIG. 2A. Therefore, only the differences between these two figures will be discussed and described in further detail below.

Like the first data structure 201A, the second data structure 201B for a mobile wallet system database 134 is managed by the client device management server 106 illustrated in FIG. 1. The second data structure 201B may comprise merchant preferences for redemption presentations of a virtual token 702 for use with point-of-sale ("POS") terminals, which may include devices such as a bar code reader. Specifically, the data structure 201A may comprise an alphanumeric merchant identifier 170, alphanumeric store identifiers 207, and a listing 210A of POS terminal preferences.

One main difference between the first data structure 201A and the second data structure 201 B is that the second data structure 201 B includes an additional element comprising the alphanumeric store identifier 207. The alphanumeric store identifier 207 allows the mobile wallet system 134 to monitor and track the preferred redemption presentations for virtual tokens 702 at a store level relative to a particular merchant 120. In this way, the merchant 120 can identify POS terminal differences that may exist between various stores owned by the same merchant 120. In addition to receiving POS terminal preferences for each particular store that may be owned by a merchant 120, the mobile wallet system 134 also has the ability to monitor, collect, and refine the preferred redemption presentation data contained within the first and second data structures 201A and 201B according to the algorithm illustrated in FIG. 27 and discussed in further detail below.

For the exemplary embodiment illustrated in FIG. 2B, a first store having a first store identifier 207A may have two preferred redemption presentations for virtual tokens 702 that include a two dimensional bar code 804A and a manual key entry format 804C. The second store associated with the first merchant identifier 205A, and having the second store identifier 207B, has only have a single preferred redemption presentation for a virtual token 702 which may comprise the manual key entry format 804C. One of ordinary skill in the art recognizes that various other combinations of redemption presentations as well as other types of redemption presentations are fully included within the scope of the invention.

Referring to FIG. 2C, this figure is a diagram of a data structure 179 for a stored value account database 146 managed by the stored value account processor server 108A and the stored value account issuer server 108B illustrated in FIG. 1. The data structure 179 may comprise a client unique identifier 155 and one or more primary account numbers ("PANs") 165 and one or more virtual card identification numbers ("VCARD ID#") 167. The PANs 165 and VCARD IDs 167 may be created for each stored value account 142 associated with a respective client device 102. The client device management server 106 may be responsible for creating the client unique identifier 155 and passing this unique identifier 155 to the stored value account issuer server 108B. Alternatively, the stored value account issuer server 108B may create the client unique identifier 155.

The client unique identifier 155 may comprise an alphanumeric character string of a predefined length. For example, the alphanumeric character string may comprise a ten digit string. However, alphanumeric strings greater than or less than ten digits are within the scope of the invention.

The client unique identifier 155 may be associated with a virtual card identification number ("VCARD ID#") 167 and unbranded account 160 when the sender client device 102A does not designate a particular merchant 120 to be associated with a set of funds for the stored value account 142. In other words, the unbranded account 160 may keep track of the funds which have been allocated to the stored value account 142 of a user who has a client unique identifier 155 but have not been associated with any particular merchant 120, such as a TARGET™ or K-MART™ brand store. The unbranded account 160 will not have any merchant name associated with the account but will have a virtual card identification number ("VCARD ID#") 167 associated with the unbranded account 160. The VCARD ID# 167 is associated with the client unique identifier 155.

For funds or value that have been purchased using the sender client device 102A and that have been designated for a particular merchant 120, such funds may be assigned to a unique primary account number ("PAN") 165 that is associated with the particular merchant 120. The unique PAN 165 may also be referred to in the industry as a bank card number and is the primary account number found on most credit cards and bank cards. The PAN 165 may be governed by an industry standard, such as those made by the International Organization for Standardization/International Electrotechnical Commission ("ISO")/("IEC"). The PAN 165 may have a certain amount of internal structure and it may share a common numbering scheme among all PANs 165 issued by the stored value account issuer server 108B.

One particular standard for the PAN 165, as of this writing, may include the ISO/IEC 7812 standard. The ISO/IEC 7812 standard contains a single-digit Major Industry Identifier ("MII"), a six-digit Issuer Identification Number ("IIN"), an account number, and a single digit check sum calculated using the Luhn algorithm. The prefix of the PAN 165 may be the sequence of digits at the beginning of the number that determine the credit card network to which the number belongs. The first 6 digits of the PAN 165 may be referred to as the Issuer Identification Number ("IIN"). These identify the institution that issued the card to the card holder. The rest of the number may be allocated or determined by the issuer, such as the stored value account issuer server 108B. The PAN 165 may comprise a sixteen digit number, but other multi-digit numbers as well as alphanumeric identifiers are within the scope of the invention.

Multiple PANs 165 may be associated with the client unique identifier 155. In other words, a single client unique identifier 155 may reference a plurality of different PANs 165, in which each PAN 165 corresponds to a particular merchant 120. This means that a single client device 102, which is assigned the client unique identifier 155, may have access to several dozen or hundreds of merchants 120 that have respective different PANs 165.

In the exemplary embodiment illustrated in FIG. 2C, the first stored value account 142A has a client unique identifier 155A of "client unique identifier #1" which has been associated with two unbranded accounts 160A and 160B that have been assigned virtual card identification numbers ("VCARD ID#") 167D and 167E respectively. The first unbranded account 160A has stored value of $10.00. The second unbranded account 160B has stored value of $15.00. The separate unbranded accounts 160A and 160B allow for the tracking of separate gifts that may have been created by different users of sender client devices 102A or separate gifts created by a single user of a single sender client device 102A.

The client unique identifier 155A has been associated with three primary account numbers ("PANs") 165A, 165B, 165C that are assigned to a first merchant having a merchant identifier 170A of "Merchant ID#1" and a second merchant having a merchant identifier 170B of "Merchant ID#2." The virtual card associated with the first PAN 165A has a stored value of $25.00 and the virtual card associated with the second PAN 165B has a stored value of $30.00. The virtual card associated with the third PAN 165C has a stored value of $35.00. The second and third virtual cards having PAN#2 and PAN#3 and associated with only the second merchant identifier 170B illustrate that a user of the recipient client device 102B may receive two separate gifts of different or same values but which are associated with the same merchant 120. While US currency has been used in these examples, one of ordinary skill in the art recognizes that any type of monetary currency may be used and is within the scope of the invention.

While the first unbranded account 160A associated with the VCARD ID#4 167D has a stored value of $10.00, according to one exemplary embodiment of the invention, a user of the recipient client device 102B may need to associate the funds of the unbranded first account 160A with a particular merchant 120 prior to being able to redeem the value of the first unbranded account 160A. In this particular example, a user of the client device 102 could transfer the funds from the unbranded account 160A to either the first or second virtual cards associated with the first PAN 165A or the second PAN 165B. Alternatively, a user could create a new virtual card associated with a new merchant 120 (relative to the merchants 120 represented by the merchant identifiers 170A, 170 in the account 142B) or an existing merchant 120 that has a fourth PAN 165 (not illustrated) for this stored value account 142A.

Also associated with each client unique identifier 155 may be one or more near field communication ("NFC") PANs 165, such as NFC PAN #1A 165A1 associated with client unique identifier #1 155A of the first stored value account 142B in FIG. 2C and NFC PAN #1B 165A2 associated with client unique identifier #2 155B of the second stored value account 142C in FIG. 2C. These NFC PANs 165 correspond to physical tokens which can be attached to a client device 102 and which utilize near-field communications to exchange information with point-of-sale ("POS") terminals as is known to one of ordinary skill in the art.

Figure 3:
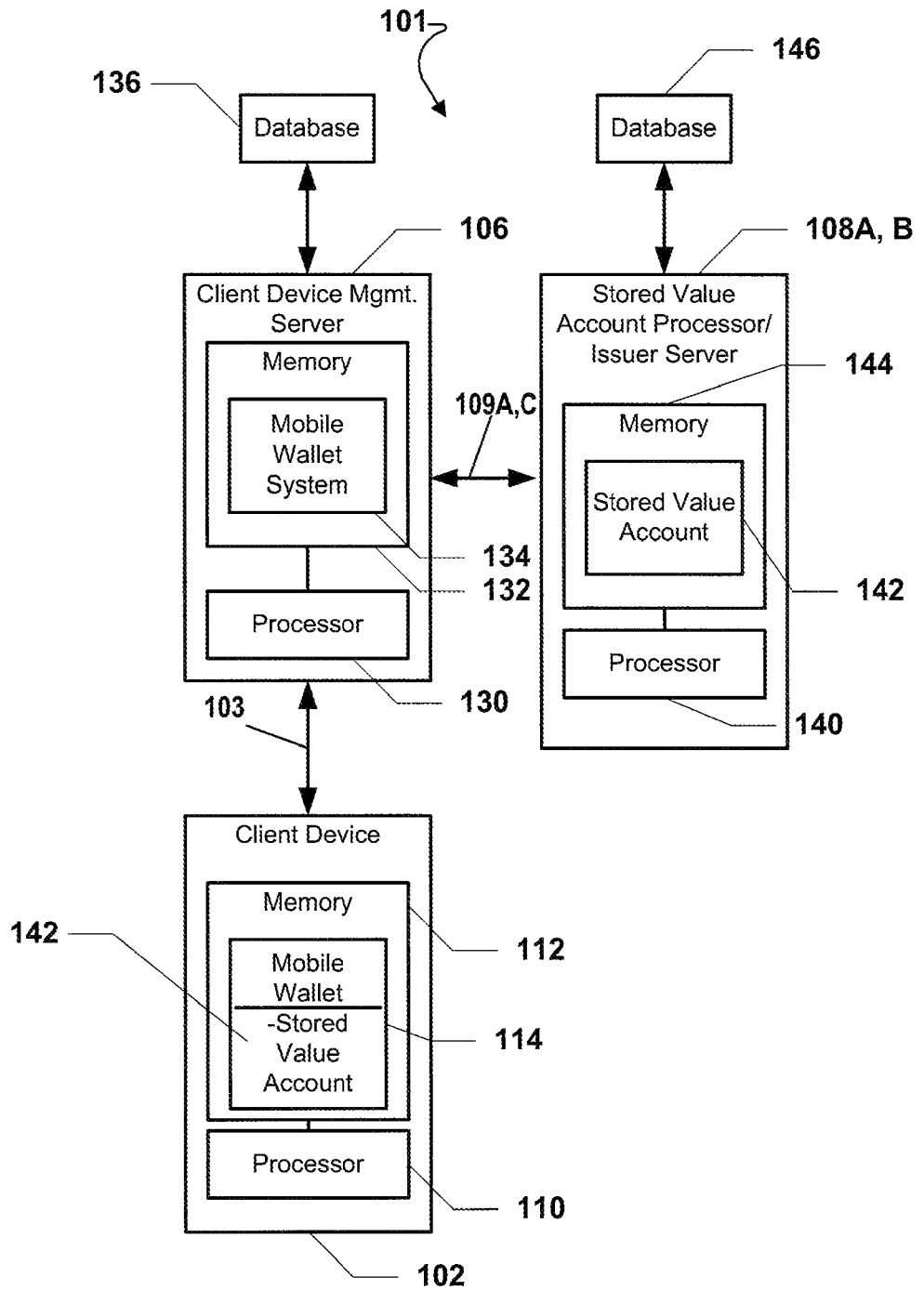
FIG. 3 is a diagram of an exemplary computer architecture for the system of FIG. 1.

FIG. 3 is a diagram of an exemplary computer architecture 101 for the system 100 of FIG. 1. The exemplary architecture 101 may include a client device 102. A client device server 106 may be connected to the mobile client device 102. The client device management server 106 may be connected to the mobile device 102 via a wired or wireless communications link 103, such as a mobile telephone network. Further, the client device management server 106 may be connected to a stored value account processor/issuer server 108A,B via a direct communications link 109A,C, such as by a WAN. As noted previously, the stored value account processor server 108A and the stored value account issuer server 108B may be two physically separate devices or software as illustrated in FIG. 1, or alternatively, the functions of these two elements 108A, B may be performed by a single device or software module as illustrated in FIG. 3. One of ordinary skill in the art will appreciate that either option may be selected depending upon computer architecture design constraints and without departing from the scope of the invention.

As illustrated in FIG. 3, the client device 102 may include a processor 110 and a memory 112 coupled to the processor 110. The memory 112 may include instructions for executing one or more of the method steps described herein. Further, the processor 110 and the memory 112 may serve as a means for executing one or more of the method steps described herein. As indicated, the memory 112 may also include a mobile wallet 114. The mobile wallet 114 may be provided to the mobile device 102 by the client device management server 106. A mobile wallet 114 provides functions similar to a traditional wallet in that it may contain account information and provide virtual tokens 702 that allow a user to access money or credit from the client device management server 106, and which allows a user to carry such information in his or her pocket.

FIG. 3 shows that the client device management server 106 may include a processor 130 and a memory 132 coupled to the processor 130. The memory 132 may include instructions for executing one or more of the method steps described herein. Further, the processor 130 and the memory 132 may serve as a means for executing one or more of the method steps described herein. As illustrated, the memory 132 may include a mobile wallet system 134 that provides information for one or more stored value accounts 142 as well as other types of accounts, such as, but not limited to, credit card accounts and bank accounts.

The mobile wallet system 134 within the client device management server 106 may be similar to the mobile wallet 114 stored within the mobile device 102. Further, the mobile wallet system 134 within the client device server 106 may include substantially the same information as the mobile wallet 114 stored within the mobile client device 102. The CDM escrow database 136 may also be connected to the client device management server 106.

As depicted in FIG. 3, the stored value account processor/issuer server 108A, B may include a processor 140 and a memory 142 coupled to the processor 140. The memory 142 may include instructions for one or more of the method steps described herein. Further, the processor 140 and the memory 142 may serve as a means for executing one or more of the method steps described herein. As illustrated, the memory 144 may include a stored value account 142 associated with a user of the mobile device 102. A database 146 may also be connected to the stored value account processor server/issuer server 108A,B. The database 146 may include account information associated with the stored value account 142 and account information associated with other user accounts associated with other mobile devices.

Figure 4:
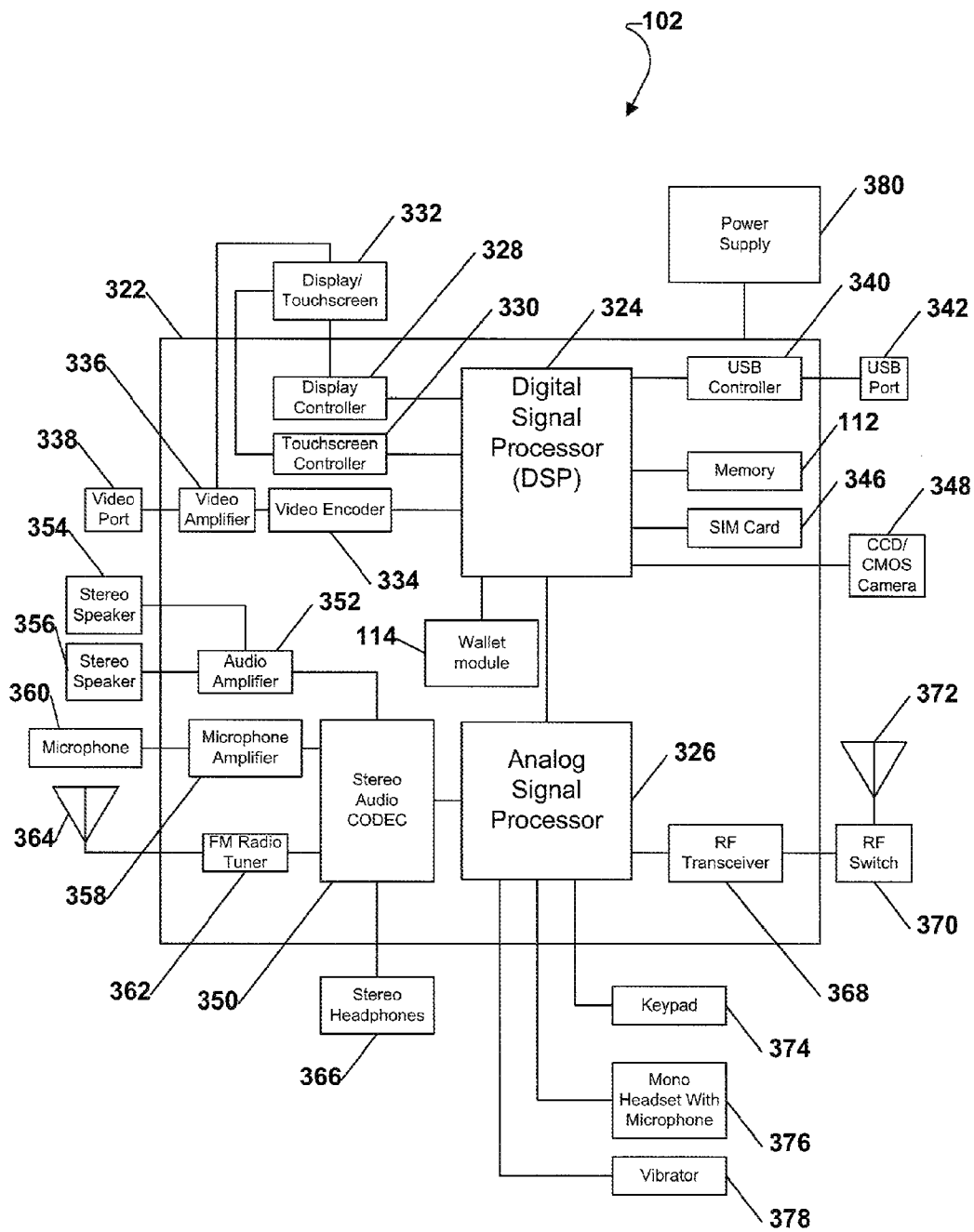
FIG. 4 is a diagram of an exemplary client device that comprises a mobile telephone.

Referring to FIG. 4, this figure is a diagram of an exemplary, non-limiting aspect of a client device 102 comprising a wireless telephone which corresponds with FIG. 1. As shown, the client device 102 includes an on-chip system 322 that includes a digital signal processor 324 and an analog signal processor 326 that are coupled together. As illustrated in FIG. 4, a display controller 328 and a touchscreen controller 330 are coupled to the digital signal processor 324. A touchscreen display 332 external to the on-chip system 322 is coupled to the display controller 328 and the touchscreen controller 330.

FIG. 4 further indicates that a video encoder 334, e.g., a phase-alternating line ("PAL") encoder, a sequential couleur avec memoire ("SECAM") encoder, a national television system(s) committee ("NTSC") encoder or any other video encoder, is coupled to the digital signal processor 324. Further, a video amplifier 336 is coupled to the video encoder 334 and the touchscreen display 332. A video port 338 is coupled to the video amplifier 336. As depicted in FIG. 4, a universal serial bus ("USB") controller 340 is coupled to the digital signal processor 324. Also, a USB port 342 is coupled to the USB controller 340. A memory 112 and a subscriber identity module ("SIM") card 346 may also be coupled to the digital signal processor 324. Further, as shown in FIG. 4, a digital camera 348 may be coupled to the digital signal processor 324. In an exemplary aspect, the digital camera 348 is a charge-coupled device ("CCD") camera or a complementary metal-oxide semiconductor ("CMOS") camera.

As further illustrated in FIG. 4, a stereo audio CODEC 350 may be coupled to the analog signal processor 326. Moreover, an audio amplifier 352 may be coupled to the stereo audio CODEC 350. In an exemplary aspect, a first stereo speaker 354 and a second stereo speaker 356 are coupled to the audio amplifier 352. FIG. 4 shows that a microphone amplifier 358 may be also coupled to the stereo audio CODEC 350. Additionally, a microphone 360 may be coupled to the microphone amplifier 358. In a particular aspect, a frequency modulation ("FM") radio tuner 362 may be coupled to the stereo audio CODEC 350. Also, an FM antenna 364 is coupled to the FM radio tuner 362. Further, stereo headphones 366 may be coupled to the stereo audio CODEC 350.

FIG. 4 further indicates that a radio frequency ("RF") transceiver 368 may be coupled to the analog signal processor 326. An RF switch 370 may be coupled to the RF transceiver 368 and an RF antenna 372. The RF transceiver 368 may communicate with conventional communications networks as well as with global positioning system ("GPS") satellites in order to obtain GPS signals for geographical coordinates.

As shown in FIG. 4, a keypad 374 may be coupled to the analog signal processor 326. Also, a mono headset with a microphone 376 may be coupled to the analog signal processor 326. Further, a vibrator device 378 may be coupled to the analog signal processor 326. FIG. 4 also shows that a power supply 380 may be coupled to the on-chip system 322. In a particular aspect, the power supply 380 is a direct current ("DC") power supply that provides power to the various components of the client device 102 that require power. Further, in a particular aspect, the power supply is a rechargeable DC battery or a DC power supply that is derived from an alternating current ("AC") to DC transformer that is connected to an AC power source.

FIG. 4 also shows that the client device 102 may include a wallet module 114. The wallet module 114 may communicate with the client device management server 106 to update wallet information stored in the client device 102. As depicted in FIG. 4, the touchscreen display 332, the video port 338, the USB port 342, the camera 348, the first stereo speaker 354, the second stereo speaker 356, the microphone 360, the FM antenna 364, the stereo headphones 366, the RF switch 370, the RF antenna 372, the keypad 374, the mono headset 376, the vibrator 378, and the power supply 380 are external to the on-chip system 322.

In a particular aspect, one or more of the method steps described herein may be stored in the memory 112 as computer program instructions. These instructions may be executed by the digital signal processor 324, the analog signal processor 326, or another processor, to perform the methods described herein. Further, the processors, 324, 326, the memory 112, the instructions stored therein, or a combination thereof may serve as a means for performing one or more of the method steps described herein.

FIG. 5 is a diagram of a touch screen display 332 for a client device 102. As shown, the mobile client device 102 may include a menu or listing 510 of program icons 505. The mobile client device 102 also includes a headset or speaker 376 that may be positioned next to a user's ear for listening to a mobile phone conversation.

Referring now to FIG. 6, this figure is a diagram of a message screen 600. The message screen 600 may be accessed by selecting a message option or message icon, such as one of the program icons 505 as illustrated in FIG. 5. The message screen 600 may include a listing of various types of messages that may be received and monitored in connection with the mobile wallet 114 stored in the client device 102. The exemplary messages illustrated in FIG. 6 include a stored value account notice 602, a balance alert, a bill pay alert, and a bank statement hypertext link. When a user selects one of the listed messages, such as the stored value account notice 602, a message detail screen such as screen 700 of FIG. 7 may be generated. The message screen 600 may also support one or more icons at the bottom of the screen, such as a dollar sign, purse icon, exclamation point icon, or other icon which may launch other software applications on the client device 102.

FIG. 7 is a diagram of a detailed message screen 700 that highlights the details of the stored value account notice 602 as illustrated in FIG. 6. The detailed message screen 700 is generated in response to the stored value account notice 602 being selected and may include a virtual token 702, a personalized message 704, a text based listing of value 706, and instructions 708 on how to redeem the stored value account.

As discussed above, according to an exemplary aspect, a sender client device 102A may purchase a stored value account 142A (that may be referred to as a virtual gift card) and send the stored value account 142B to a recipient client device 102B. A user selects a stored value account 142A at the sender client device 102A and sends it to the recipient client device 102B where the received account is referred to as 142B.

The sender client device 102A may generate a personalized token 702 and a personalized message 704A that is sent to the recipient client device 102B. In order to activate or use the stored value account 142 associated with the virtual stored value token 702, the recipient client device 102B may initiate the mobile wallet 114 by activating or touching the launch wallet button 710. The detailed message screen 700, like the message screen 600, may include additional icons at the bottom of the screen to activate various functions and/or different applications such as a back button, a forward button, an increase/decrease magnification icon, and a help button.

Referring to FIG. 8A, this is a diagram of a screen 800A that lists options for managing a stored value account 142. The options screen 800A may comprise virtual token 702 having a listing of account information 802 associated with the stored value account 142 such as the name of the merchant "Merchant #1", the last four digits of the multi-digit digit PAN 165, a current value, and a graphical representation of a magnetic stripe so that the user of the client device 102 recognizes that possible use of the virtual token 702.

The options screen 800A may further comprise icons that are associated with different options for managing the stored value account 142. Such icons may be illustrated with symbols to suggest their intended functions. Such icons may be associated with, but are not limited to, the following functions/operations: refresh 815, a share function 806, a split function 817, an add value operation 821, an exchange operation 819, and a re-gift operation 823.

If the share card icon 806 is selected by a user, then the user of the recipient client device 102B may send a portion or all of the value associated with the stored value account 142 to another recipient client device 102B. Activating this icon or button 806 may initiate another user interface that instructs the user how the value associated with the stored value account 142 may be shared with another recipient client device 102B. The recipient of a shared stored value account 142 may have reduced functionality for shared stored value accounts 142. The shared stored value account recipient may be restricted to the following actions: viewing the current available balance of the shared stored value account 142; and presenting the shared stored value account 142 at a merchant point-of-sale ("POS") device.

Generally, a recipient of the shared stored value account 142 will not be able to distribute the shared stored value account 142 to others; exchange the stored value account 142 to another merchant brand; or add value to the stored value account 142. If the owner of the stored value account 142 exchanges the brand associated with the account 142, then the client device management server 106 may notify and revoke the sharing privileges with those participants who are currently sharing the stored value account 142 with the owner.

The client device management server 106 may send a notification to the owner of a stored value account for purchases made by a shared account recipient with a shared version of the stored value account 142. This notification may include the time of purchase, date of the purchase, the city and state of the merchant location, and the purchase amount. Purchases made by the owner will generally not be provided to any of the shared account recipients. Further, purchases made by shared account recipients will usually not be provided to other shared account recipients of the stored value account 142. Further, any personalizations associated with the stored value account 142 will generally only be provided to the intended recipient client device 102B. The personalizations will usually not be provided to any shared account recipients of the stored value account 142. Instead, the shared account recipient may receive a generic virtual token 702 that does not have any personalized element.

If the refresh icon 815 is selected by a user, then the activation of this icon may allow the screen 800A to refresh itself so that a current balance of the virtual token 702 is displayed in the account information 802. As noted previously, if the stored value account 142 associated with the virtual token 702 is being shared, then other users may be making purchases or withdrawals relative to the stored value account 142. In such circumstances of simultaneous use of the same stored value account 142, the current account balance becomes very relevant to a user who is about to purchase a good or service using the virtual token 702 and corresponding stored value account 142.

The split icon 817 when selected may activate an operation that allows the user of the recipient client device to split the funds associated with a single PAN 165 so that two sets of the total value of the funds are now associated with two PANs 165. In essence, this split function allows the user of the recipient client device 102B to create two virtual tokens 702 having two values based on single virtual token 702 that had an original value.

The exchange icon 819 allows a user of the client device 102 to exchange value associated with one merchant for value with another merchant. The re-gift icon 823 allows a user of a client device 102 to send a stored value account to another recipient client device 102B. In essence, the re-gift icon 823 initiates a process very similar to steps 1607-1621 described below in connection with FIG. 16A. Other options for managing a stored value account 142, though not specifically illustrated, are within the scope of the invention as understood by one of ordinary skill in the art.

Figures 8B, 8C:
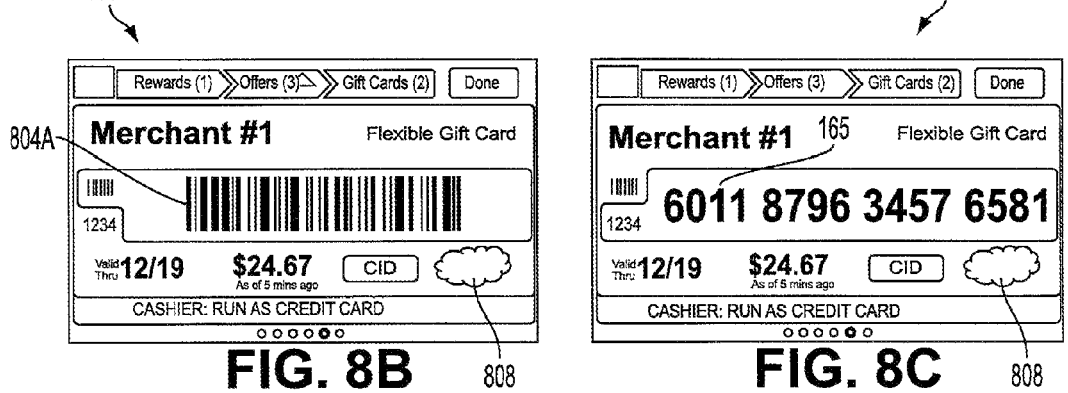
FIG. 8B is a diagram of a first detailed purchase/redemption presentation screen for a stored value transaction.
FIG. 8C is a diagram of a second detailed purchase/redemption presentation screen for a stored value transaction.

FIG. 8B is a diagram of a first detailed purchase/redemption presentation screen 800B for a stored value transaction. This screen 800B may be generated in response to a user of the client device 102 selecting the "use card" button listed on the virtual token 702 of FIG. 8A. A merchant may use a scanner to enter a one-dimensional barcode 804A. Exemplary one-dimensional bar codes may include, but are not limited to, U.P.C., Codabar, Code 25—Non-interleaved 2 of 5, Code 25—Interleaved 2 of 5, Code 39, Code 93, Code 128, Code 128A, Code 128B, Code 128C, Code 11, CPC Binary, DUN 14, EAN 2, EAN 5, EAN 8, EAN 13, Facing Identification Mark, GS1-128 (formerly known as UCC/EAN-128), GS1 DataBar formerly Reduced Space Symbology ("RSS"), HIBC (HIBCC Bar Code Standard), ITF-14, Latent image bar code, Pharmacode, Plessey, PLANET, POSTNET, Intelligent Mail Bar code, MSI, PostBar, RM4SCC/KIX, JAN, and Telepen.

The current value of the stored value account 142 may be retrieved by the client device 102 immediately prior to the display of the account information and the barcode 804A to insure it is accurate as possible at the time of sale. The amount of time for the client device 102 to retrieve the current value of the stored value account 142 may be approximately under five seconds, depending on network availability and other factors. If a delay is experienced, such as on the order of greater than ten seconds, then the last cached balance along with an "as of" date stamp may be displayed by the client device 102.

Screen 800B may be displayed when a user of the recipient client device 102B desires to redeem a stored value account 142 for purchasing goods or services at a point of sale ("POS") terminal in a store or if the user wishes to purchase goods and/or services over a telephone network. Screen 800B may also comprise a "watermarked" background 808 that is displayed behind or adjacent the two-dimensional barcode 804. This "watermarked" background 808 may contain an image that has a pattern which may be difficult to reproduce and may be human-readable, such as by a cashier who may check the detailed purchase screen 800 for authenticity. Screen 800B may include the ability to present multiple virtual tokens associated with the same merchant. These virtual tokens 702 may be associated with other store value accounts 142, external account information, including loyalty, membership or reward accounts, merchant stored value accounts, or product discount certificates. Each of these virtual tokens 702 may be displayed separately upon selection by a user.

Information on the detailed purchase screen 800B is usually presented in a clear, high-contrast manner so that it is easily readable by a cashier at a standard distance, such as a distance of approximately thirty-six inches, preferably in a manner consistent with how a traditional physical token, like a credit card number, is typically displayed to a cashier.

FIG. 8C is a second diagram of a detailed purchase/redemption presentation screen 800C for a stored value transaction. This detailed purchase screen 800B is generally a human-readable display of stored value account information that may be used by a cashier to manually enter into a point-of-sale terminal to submit for authorization or for a user to enter into a website for an on-line purchase over the Internet. A merchant may key-in the account information, such as the PAN 165.

Figure 8D:
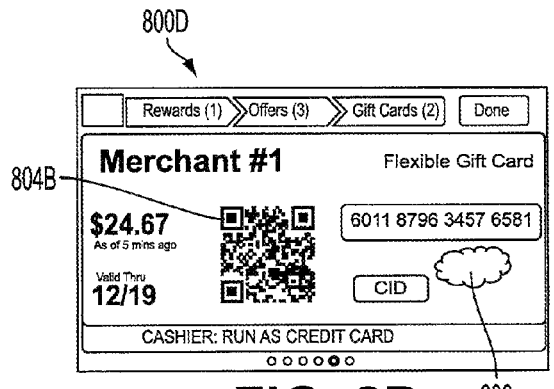
FIG. 8D is a diagram of a third detailed purchase/redemption presentation screen for a stored value transaction.

FIG. 8D is a third diagram of a detailed purchase/redemption presentation screen 800D for a stored value transaction. This diagram is similar to FIG. 8B, however, instead of a one-dimensional bar code being displayed, a two-dimensional barcode 804B is displayed for a POS terminal that may scan such a barcodes 804B. The 2-D bar code may include, but is not limited to, the following symbologies: Aztec Code, 3-DI, ArrayTag, Small Aztec Code, Chromatic Alphabet, Chromocode, Codablock, Code 1, Code 16K, Code 49, ColorCode, Compact Matrix Code, CP Code, CyberCode, d-touch, DataGlyphs, Datamatrix, Datastrip Code, Dot Code A, EZcode, Grid Matrix Code, High Capacity Color Bar code, HueCode, INTACTA.CODE, InterCode, MaxiCode, mCode, MiniCode, Micro PDF417, MMCC, Nintendo e-Reader#Dot code, Optar, PaperDisk, PDF417, PDMark, QR Code, QuickMark Code, Semacode, SmartCode, Snowflake Code, ShotCode, SuperCode, Trillcode, UltraCode, UnisCode, VeriCode, VSCode, WaterCode, for example.

If the recipient client device 102B is a desktop or laptop computer or if the recipient client device 102B is being used for an e-commerce transaction, then the sixteen digit PAN 165 may be presented on the display device, such as a computer screen, in such a way so as to allow copying and pasting of the sixteen digit PAN 165 into an e-commerce website. The recipient client device 102B may be provided with text based instructions on how to enter the sixteen digit PAN 165 into an e-commerce website. Exemplary text based instructions may include where to find the expiration date associated with the sixteen digit PAN 165 and what to enter if a card verification value ("CVV") or card identification ("CID") number is requested by a merchant 120.

Figures 8E, 8F:
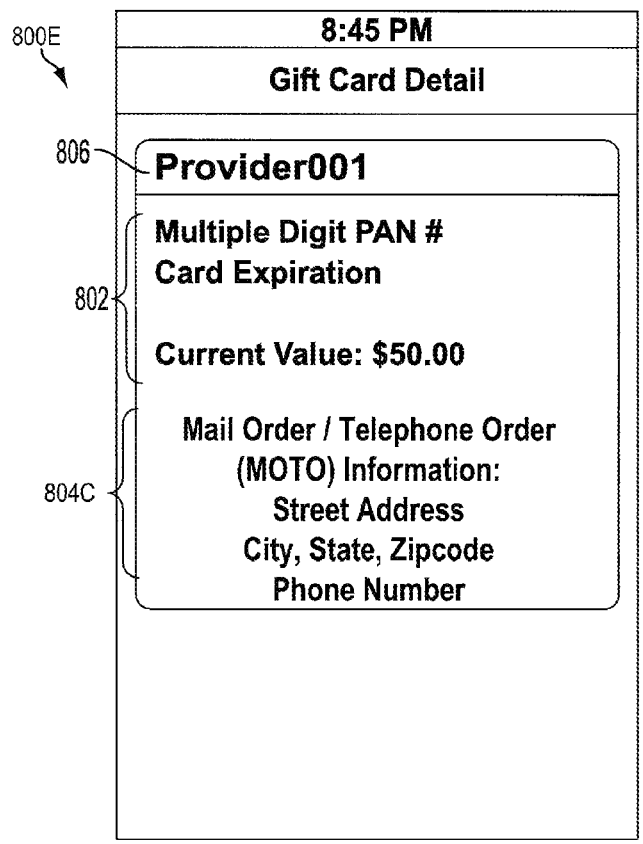
FIG. 8E is a diagram of a fourth detailed redemption presentation screen for a stored value transaction.
FIG. 8F is a diagram of a fifth detailed redemption presentation screen for a stored value transaction.

FIG. 8E is a fourth diagram of a detailed redemption presentation screen 800E for a stored value transaction. The redemption presentation screen 800E illustrated in FIG. 8E shares several elements which are similar to those in the first detailed redemption presentation screen 800B illustrated in FIG. 8B. Therefore, only the differences between these two figures will be discussed and described in further detail below.

In this exemplary embodiment, the manual MOTO format 804C may be presented in addition to the sixteen digit PAN 165 on the display device, such as a mobile phone, in such a way so as to allow copying and pasting of this information into an e-commerce website. The recipient client device 102B may be provided with text based instructions on how to enter the information presented into an e-commerce website. Exemplary text based instructions may include where to find the expiration date associated with the sixteen digit PAN 165 and what to enter if a card verification value ("CVV") or card identification ("CID") number is requested by a merchant 120.

FIG. 8F is a fifth diagram of a detailed redemption presentation screen 800F for a stored value transaction when a client device 102B comprises a desktop or laptop computer or a wireless mobile device attempting to perform an on-line or e-commerce transaction. In this exemplary embodiment, the mobile wallet system 134 may detect that a user is conducting an on-line or e-commerce transaction and then pre-populate fields 815 of a website with stored value account information using a mail-order/telephone-order ("MOTO") template stored in the mobile wallet system 134.

FIG. 9 is a diagram of a screen 900 for introducing a stored value account purchase option. A user of a client device 102 may activate the stored value account purchase option by selecting one of the icons 505 of FIG. 5. The screen 900 may have several different elements, which include, but are not limited to, a wireless status icon 912, a time of day indicator 914, a battery level indicator 916, a "gifting a gift card" status indicator 918, "recipient" status indicator 902, and a "selected gift card" status indicator 904. The screen 900 may also have a "select a card value" option 906, an "add a message" option 908, and a payment method menu 910.

The wireless status icon 912 may indicate the relative strength of a wireless communication link 103 for a client device 102. The battery level indicator 916 may provide status on the current energy level of the power supply 380. The time of day indicator 914 may display the current time in an hour and minutes format.

The "gifting a gift card" status indicator 918 informs the user of the client device 102 that a gift mode has been activated. In this gift mode, a user can select a recipient who will receive the stored value account 142 being purchased. Specifically, a user may activate the "recipient" indicator 902 in order to identify a particular person who should receive the stored value account 142 being purchased. The "select a gift card" indicator 904 may be activated by a user so that a particular merchant 120 for the stored value account 142 may be selected from a list of merchants 120. The "select a card value" option 906 allows a user to select an amount of value that should be associated with the stored value account 142 being created.

The "add a message" option 908 allows a user to select from a list 704 of messages that can be transmitted to the recipient of the stored valued account 142 being created. The "payment method" option 910 allows a user to select from a list of available options for creating value in the stored value account 142. Such options may include, but are not limited to, credit cards, debit cards, checking accounts, and other stored value accounts 142 that may be associated with the user of the sending client device 102A.

Referring to FIG. 10, this figure is a diagram of a screen 1000 for displaying available databases 1002A, 1002B, 1002C that may be used to select a recipient of a stored value account 142. Screen 1000 may be generated in response to a user selecting the "recipient indicator 902 in FIG. 9.

The first database 1002A may comprise one that lists family members relative to the user of the sending client device 102A. The mobile wallet system 134 may keep track of people who are related to the user of the sending client device 102A and it may maintain and update various databases 1002. The second database 1002B may comprise a friends database in which a user of the sending client device 102A has identified people to the mobile wallet system 134 who are friends relative to the user of the sending client device 102A. Alternatively, or in addition to the user of the sending client device 102A identifying his or her friends to the mobile wallet system 134, the mobile wallet system 134 may also access social networks in which a user of the sending client device 102A is a subscriber. For example, as of this writing, social networks include, but are not limited to, the FACEBOOK™ brand social network as well as the MYSPACE™ brand social network.

The third database 1002C may comprise one that lists colleagues or professionals related to the user of the sending client device 102A. Similar to the second database 1002B that comprises friends, the mobile wallet system 134 may access professional networks in which a user of the sending client device 102A is a subscriber. For example, as of this writing, professional networks include, but are not limited to, the Linked-In™ brand professional network as well as the NAYMZ™ brand professional network. The mobile wallet system 134 may periodically update its three databases 1002 by accessing the various social and professional networks discussed above.

In the exemplary embodiment illustrated in FIG. 10, the second database 1002B that comprises friends relative to the user of the sending client device 102A has been selected as indicated by the circle with dashed lines. In response to the selection of the second database 1002B, the mobile wallet system 134 may transmit friends data that can include, but is not limited to, photographic icons 1004 and text names of the friends relative to the user of the sending client device 102A. The user of the sending client device 102A may select an icon 1004 representing one of the friends relative to the user. In the exemplary embodiment illustrated in FIG. 10, the second friend having the icon 1004B was selected by the user as indicated by the dashed circle surrounding the icon 1004B.

FIG. 11 is a diagram of a screen 1100 for displaying a confirmation of the recipient selected in the screen of FIG. 10. Specifically, screen 1100 displays the recipient icon 1004B that was selected by the user in FIG. 10. The recipient icon 1004B is placed in a position that was previously occupied by the "recipient" status indicator 902 of FIG. 9 so that the user of the sending client device 102A has a visual confirmation of the recipient of the stored value account 142 which has been selected. In FIG. 11, a user selected or activated the "select a gift card" status indicator 904 which is highlighted by the dashed circle in this figure.

FIG. 12 is a diagram of a screen 1200 for displaying options for the types of merchants 120 that may be selected for a stored value account 142. FIG. 12 may be generated in response to the activation of the "select a gift card" status indicator 904 of FIG. 11. The mobile wallet system 134 may organize available merchants 120 according to goods and/or services that may be sold by particular merchants 120. In the exemplary embodiment illustrated in FIG. 12, three categories of merchants 120 are available to be selected by the user of the sending client device 102A: a shopping category 1202A, an eating category 1202B, and a playing category 1202C. In the exemplary embodiment illustrated in FIG. 12, the shopping category 1202A has been selected as indicated by the dashed circle.

In response to the selection of this shopping category 1202A, the mobile wallet system 134 may provide two separate listings 1204A, 1204B of available merchants 120 for associating with the stored value account 142. The first listing 1204A may comprise merchants 120 in which the mobile wallet system 134 has detected prior use by the designated recipient of the stored value account 142. The second listing 1204B of merchants 120 may comprise merchants 120 in which the mobile while system 134 has not detected any history or use by the designated recipient of the stored value account 142.

Figure 13:
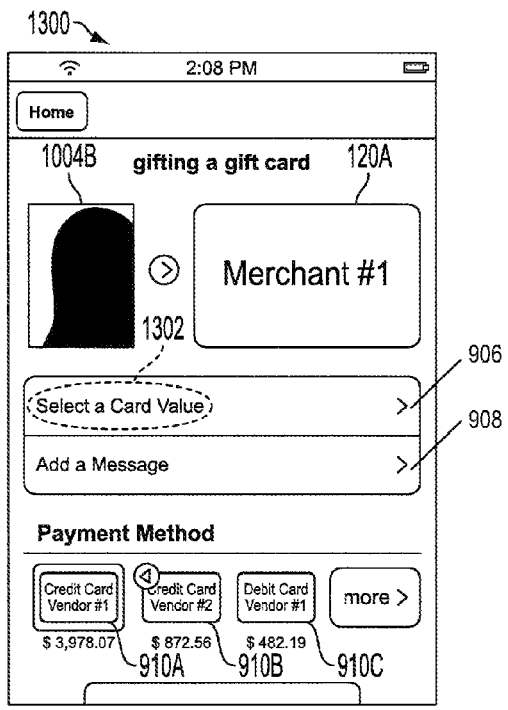
FIG. 13 is a diagram of a screen for displaying a confirmation of the merchant selected in the screen of FIG. 12.

FIG. 13 is a diagram of a screen 1300 for displaying a confirmation of the merchant 120 selected in the screen 1200 of FIG. 12. In this figure, the icon for the first merchant 120A that was selected in screen 1200 of FIG. 12 now occupies the space previously occupied by the "selected gift card" status indicator 904. In FIG. 13, the user has now selected the "select a card value" option 906 as indicated by the dashed circle 1302.

Figure 14:
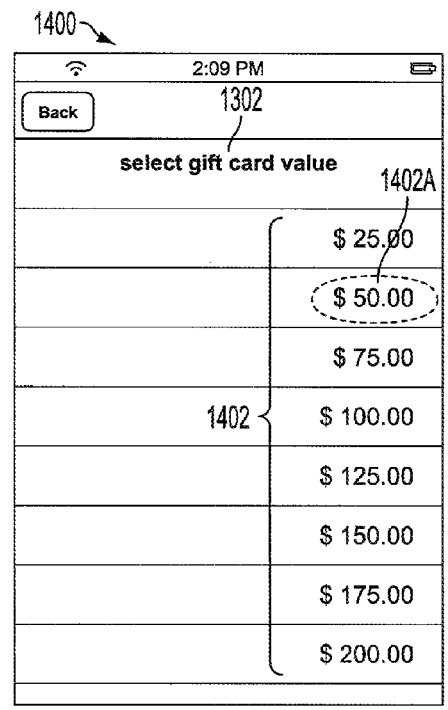
FIG. 14 is a diagram of a screen for displaying available exemplary values that can be selected by a user of the client device for a stored value account.

FIG. 14 is a diagram of a screen 1400 for displaying available exemplary values 1402 that can be selected by a user of the client device 102A for a stored value account 142. Screen 1400 may be generated in response to the user activating the "select a card value" option 906 of FIG. 13 in screen 1300. The exemplary values 1402 can comprise fixed values in a particular currency such as U.S. dollars or Euros. However other types of values are within the scope of the invention. For example, a merchant 120 may have value represented in points instead of currency. Also, the user interface of screen 1300 may also comprise an area in which the user could enter a specific amount of value for the stored value account 142 that is being created. In the exemplary embodiment illustrated in FIG. 14, a value 1402A of $50.00 has been selected as indicated by the dashed circle.

Figure 15:
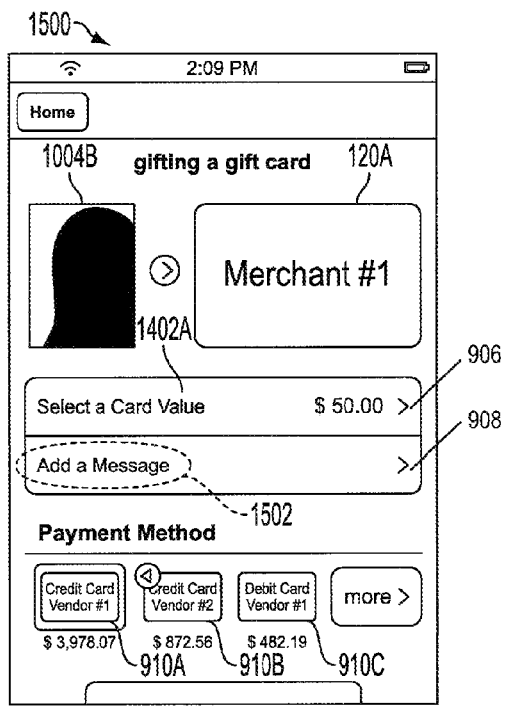
FIG. 15 is a diagram of a screen for displaying a confirmation of an amount of value for a stored value account selected by a user of the client device.

FIG. 15 is a diagram of a screen 1500 for displaying a confirmation of an amount of value 1402A for a stored value account 142 selected by a user of the sending client device 102A. The value 1402A comprises the $50.00 which was selected in the user interface of screen 1400 of FIG. 14. In this exemplary embodiment of FIG. 15, the "add a message" option 908 has been selected as indicated by the dashed circle 1502.

Figure 16:
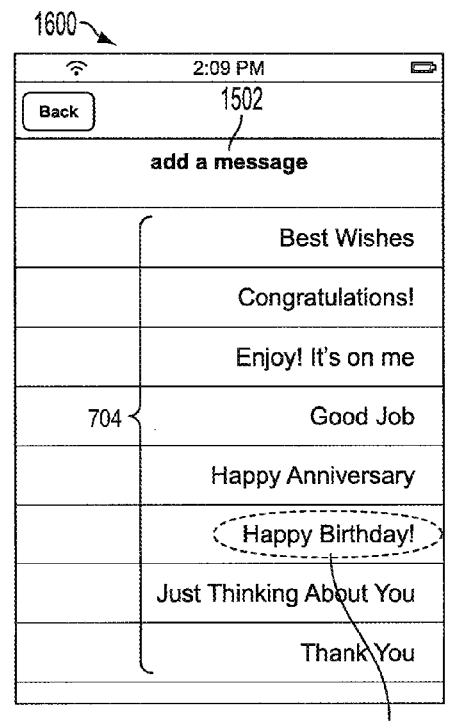
FIG. 16 is a diagram of a screen for displaying exemplary messages that may be selected for a stored value account by a user of the client device.

FIG. 16 is a diagram of a screen 1600 for displaying exemplary messages 704 that may be selected for a stored value account 142 by a user of the sending client device 102A. The exemplary messages 704 may include those that are appropriate for a gift context. However, any type of message 704 may be presented according to the invention. Further, while not illustrated, the user interface of screen 1600 may allow a user to enter or input their own unique and/or personalized message 704. In the exemplary embodiment of FIG. 16, the user has selected the message 704A comprising the message "Happy Birthday."

FIG. 17 is a diagram of a screen 1700 for displaying a confirmation of the message 704A selected in the screen 1600 of FIG. 16 by a user of the sending client device 102A. In this figure, adjacent to the "add a message" option 908 is the message 704A of "Happy Birthday" which was selected in screen 1600 by the user. In the exemplary embodiment of FIG. 17, one of the payment options 910B has been selected by the user as indicated by the dashed circle.

FIG. 18 is a diagram of a screen 1800 for displaying a confirmation of the payment method 910B selected in the screen 1700 of FIG. 17 by a user of the sending client device 102A. In this figure, the selected payment method 910B is highlighted with a solid rectangle and a purchase button 1802 is displayed in response to the selected payment method 910B.

FIG. 19 is a diagram of a screen 1900 for displaying a receipt 1902 of the purchased stored value account 142 which was selected by the user of the sending client device 102A. The receipt 1902 may comprise information such as, but not limited to, a name of the merchant 120, the date of the purchase for the stored value account 142, an approval code, the selected value 1402A for the stored value account 142, any processing fees, a total amount due, the selected payment method 910B, and a purchase approval message.

FIG. 20 is a diagram of a screen 2000 for displaying a gift card token that has been received by a user of a receiving client device 102B. The screen 2000 may provide detailed stored value account information 2002 which may include, but is not limited to, the name of the designated recipient of the stored value account 142, the mobile phone number of the designated recipient of the stored value account 142, the message 704A which was selected by the user of the sending client device 102A, the value 1402A which was selected by the user of the sending client device 102A, and an icon representing the merchant 120A associated with the stored value account 142.

Figure 21:
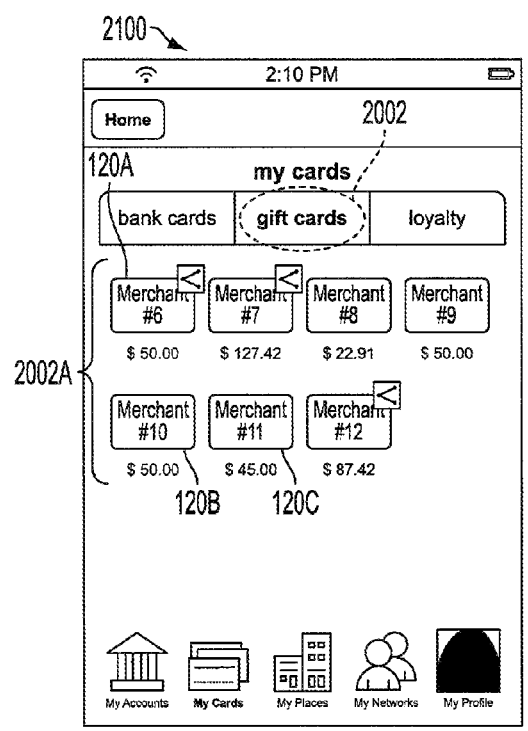
FIG. 21 is a diagram of a screen for displaying balances of stored value accounts available to a user of a client device.

FIG. 21 is a diagram of a screen 2100 for displaying a listing 2002A of balances for stored value accounts 142 available to a user of a client device 102. Screen 2100 can display account balances for other types of accounts such as banking accounts and loyalty cards. In the exemplary embodiment illustrated in FIG. 21, the gift card or stored value account balance option 2002 has been selected by the user of the client device 120. In response to this selection, the client device 102 may display the listing 2002A of stored value accounts 142 that may be accessed with the client device 102. The listing 2002A of stored valued accounts 142 may comprise various icons that represent the different merchants 120 associated with the stored value account 142.

Figure 22:
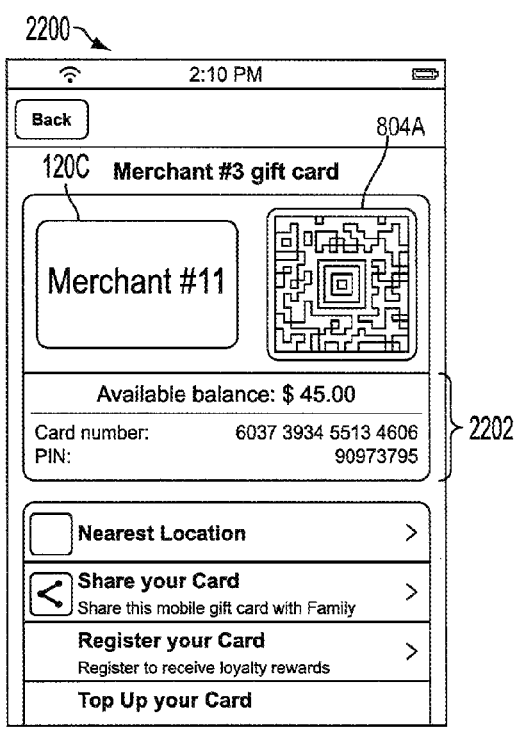
FIG. 22 is a diagram of a screen for displaying an exemplary redemption presentation to a user of a client device.

FIG. 22 is a diagram of a screen 2200 for displaying an exemplary redemption presentation to a user of a receiving client device 102B. Screen 2200 may display an icon representing a merchant 120C and a bar code, such as a two-dimensional bar code 804A. Screen 2200 may also display other human readable card information 2202 that may include, but is not limited to, and available balance of the stored value account 142, a card number associated with the stored value account 142, and a personal identification number ("PIN") associated with the stored value account 142.

Figure 23A:
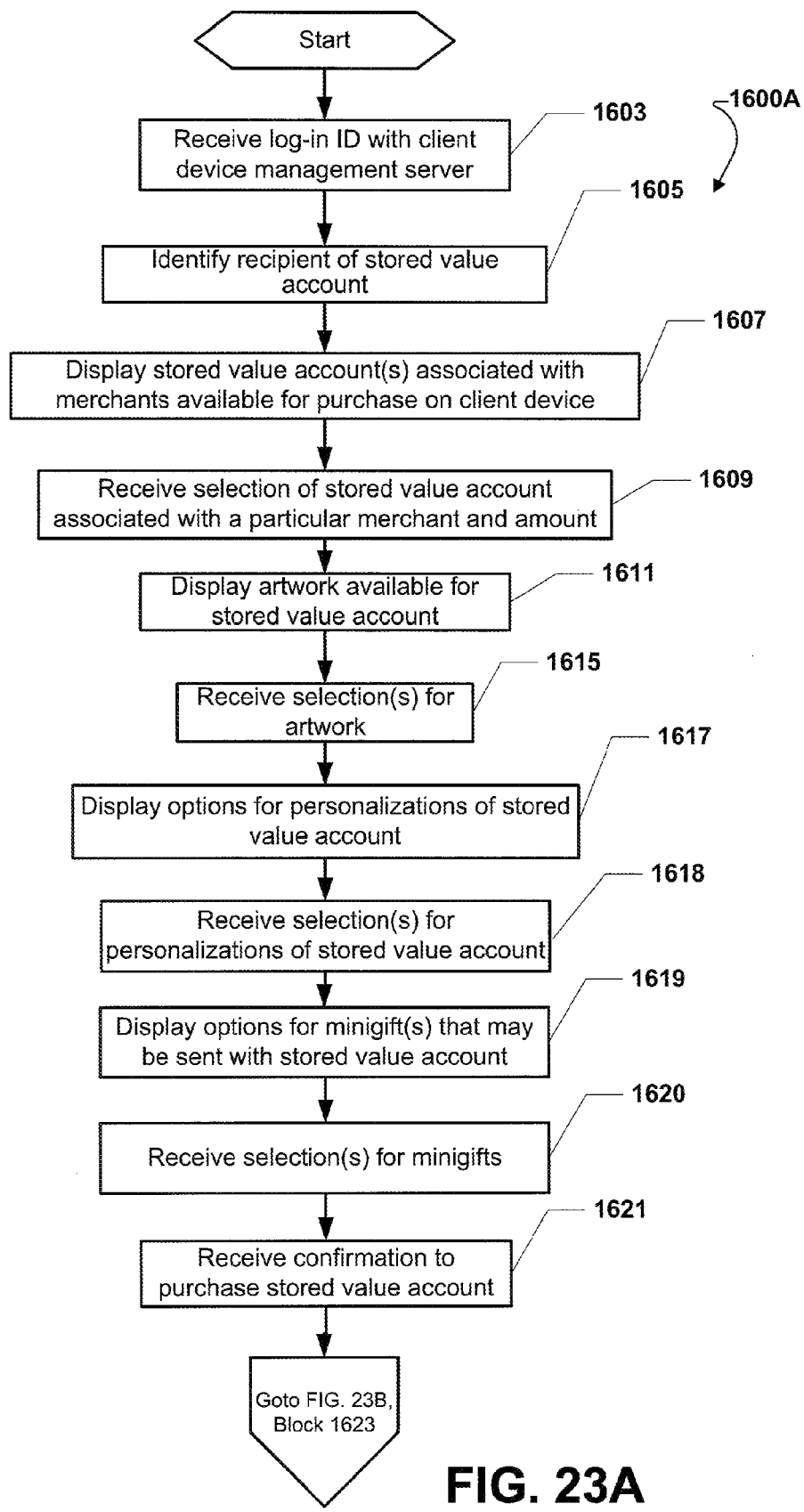
FIGS. 23A-23E are flowcharts illustrating a method for creating and managing a stored value account associated with a client device.

Referring to FIG. 23A, this figure is a first flowchart 1600A illustrating a method 1600 for creating and managing a stored value account 142 associated with a client device 102. Block 1603 is the first step in a process 1600 in which the client management server 106 may receive a log-in identifier from a sender client device 102A to access the mobile wallet system 114. At block 1605, the sender client device 102A may identify the recipient of the stored value account 142 that may be purchased by an operator of sender client device 102A. For example, see FIG. 10 and screen 1000 which provides three databases 1002A, 1002B, and 1002C from which a recipient can be identified. Alternatively, the sender client device 102A is prompted to provide contact information for the recipient of the stored value account 142. Usually, at a minimum, the sender client device 102A will need to provide an e-mail address or a mobile telephone number of the recipient of the stored value account 142, if the recipient is not listed in one of the databases provided by the mobile wallet system 134.

Also at block 1605, the client device management server 106 may also prompt the sender client device 102A for the name of the user associated with the sender client device 102A. This name associated with the sender client device 102A will be used in the notification that may be delivered to the recipient client device 102B. This name field for the sender client device 102A may be pre-populated by the client device management server 106.

Next, at block 1607, the client device management server 106 may present or display stored value account(s) 142 associated with merchants 120 available for purchase on the sender client device 102A. A listing of stored value accounts organized by merchant types like the listing 1204B of stored value accounts 142 in FIG. 12 may be presented on the display device 332 of the sender client device 102A. At this block 1607, an unbranded stored value account 142 may be listed as one of the options for selection by the sender client device 102A. Also, the user of the sender client device 102A may be provided with the ability to select the amount of value that he or she desires to purchase for associating with the stored value account 142. For example, see FIG. 14 and screen 1400 which has a listing 1402 values that may be selected by a user. The value that may be purchased for each stored value account 142 may be based on preferences selected by a merchant 120 associated with a stored value account 142. This means that a merchant 120 may establish a set of pre-denomination values that are available to the sender client device 102A.

Moving to block 1609, the client device management server 106 may receive a selection of the stored value account 142 from the sender client device 102A. For example, see FIGS. 12-13 in which a first merchant 120A has been selected by a user. Also, the client device management server 106 may also receive the selected value for purchase from the sender client device 102A that will be associated with the stored value account 142. For example, see FIGS. 13-14 in which a value 1402A of $50.00 has been selected by a user.

The selected stored value account 142 may have a merchant identifier unique to a particular merchant 120, such as an alphanumeric code. At this stage, a sender client device 102A may also select an unbranded stored value account 142 that is not associated with any particular merchant 120 and which does not have any merchant identifier.

At block 1611, the client device management server 106 may display artwork available for the virtual token 702 associated with the selected stored value account 142. The client device management server 106 may generate a listing of available artwork for the virtual token 702 similar to the listing 1204 of FIG. 12. The sender client device 102A will have the ability to preview each design or artwork that may be used for the virtual token 702. The options for the design or artwork of the virtual token 702 may be provided by a merchant 120 associated with the stored value account 142 that was selected. For unbranded accounts 142, the client device management server 106 may also display artwork available for such accounts 142 based on preferences maintained by the client device management server 106.

Subsequently, at block 1615, the client device management server 106 may receive the selection(s) for the artwork made by an input entered on the sender client device 102A. At block 1617, the client device management server 106 may display a plurality of options for personalizations of the stored value account 142. Personalizations may include the ability of the sender client device 102A to include one or more of the following elements to be associated with the stored value account 142 that will be sent to the recipient client device 102B as part of the gifted stored value account 142: a text note 704, an audio recording, an image, and a video recording. The client device management server 106 may also display fees that may be charged for each type of personalization.

The text note form of personalization may be the default personalization associated with the "gifting" of a stored value account 142 by the sender client device 102A. This text note may be part of the notification of the stored value account 142 that is sent to the recipient client device 102B. The text note may be viewed on a mobile telephone or on a website depending upon the form of the recipient client device 102B that is selected by a user to access the gifted stored value account 142. For example, see FIGS. 15-16 in which the text note 704A comprising "Happy Birthday" has been selected. The text note may be limited to a predetermined length of characters, such as three hundred. However, one of ordinary skill in the art recognizes that other character lengths are included within the scope of the invention.

The audio recording personalization to be associated with the stored value account 142 and its corresponding virtual token 702 may require an additional fee from the sender client device 102A. The audio recording may also be limited to a predetermined length. One exemplary length is sixty seconds, however, other lengths of recording periods for the audio recording are within the scope of the invention. Other lengths of recording periods for the audio recording may be offered for additional surcharges. The sender client device 102A may be provided with the ability to preview, re-record, or remove the audio recording at any point prior to confirming the purchase of the stored value account 142. During the audio recording, the sender client device 102A may present a user interface that displays the amount of remaining time left to complete a particular audio recording.

The image capture personalization may be defined by the current camera settings of the sender client device 102A. A standard surcharge may be imposed on the sender client device 102A for any image associated with the stored value account 142 and its corresponding virtual token 702. Similar to the audio recording, the sender client device 102A may be provided with the ability to preview, retake, or review the captured image at any point prior to confirming the purchase of the stored value account 142.

For the video recording personalization option, a standard surcharge may also be imposed on the sender client device 102A for selecting this option. The length of the recording period of the video recording may also be predetermined or predefined. An exemplary maximum video length for the recording period may include one limited to sixty seconds, however, other lengths for the recording periods are within the scope of the invention. Other lengths for the recording periods for the video recording may be offered for additional surcharges.

According to one exemplary embodiment, only a single personalization may be selected by the sender client device 102A. In other words, if an image personalization is selected by the sender client device 102A, then all remaining personalizations which would include the text note, the audio recording, and video recording options may be disabled. However according to alternate exemplary embodiments, multiple personalizations could be offered and permitted as long as the sender client device 102A pays the additional surcharges associated with each personalization. According to a further alternate exemplary embodiment, personalizations could be bundled to provide discounts as incentives for the sender client device 102A to purchase multiple personalizations that may be associated with the gifted stored value account 142.

Referring back to block 1618 of FIG. 23A, the client device management server 106 may receive the one or more selections for the personalizations of the stored value account 142 that may be purchased by the sender client device 102A.

At block 1619, the client device management server 106 may display a plurality of options for minigifts that may be sent with stored value account 142. Minigifts may include the ability of the sender client device 102A to include one or more of the following digital elements to be associated with the stored value account 142 that will be sent to the recipient client device 102B as part of the gifted stored value account 142: electronic games, ring tones, video, music, and other like digital elements. Minigifts usually include pre-recorded digital elements that are usually not created by a user of the sender client device 102A.

Next, in block 1620, selection(s) of the minigifts that may chosen by the user of the sending client device 102A may be received. One or more minigifts may be selected by a user of the client device 102.

At block 1621, the client device management server 106 may display a user interface that prompts the operator of the sender client device 102A to confirm the purchase of the selected stored value account 142 and its corresponding virtual token 702 and any personalizations selected using the sender client device 102A. Also at block 1621, the client device management server 106 may receive the confirmation for purchase of the stored valued account 142 from the sender client device 102A. See for example, FIG. 18 and screen 1800 having a purchase button 1802 available for selection by the user. The process 1600 then proceeds from FIG. 23A to the continuation flow chart of FIG. 23B.

Figure 23B:
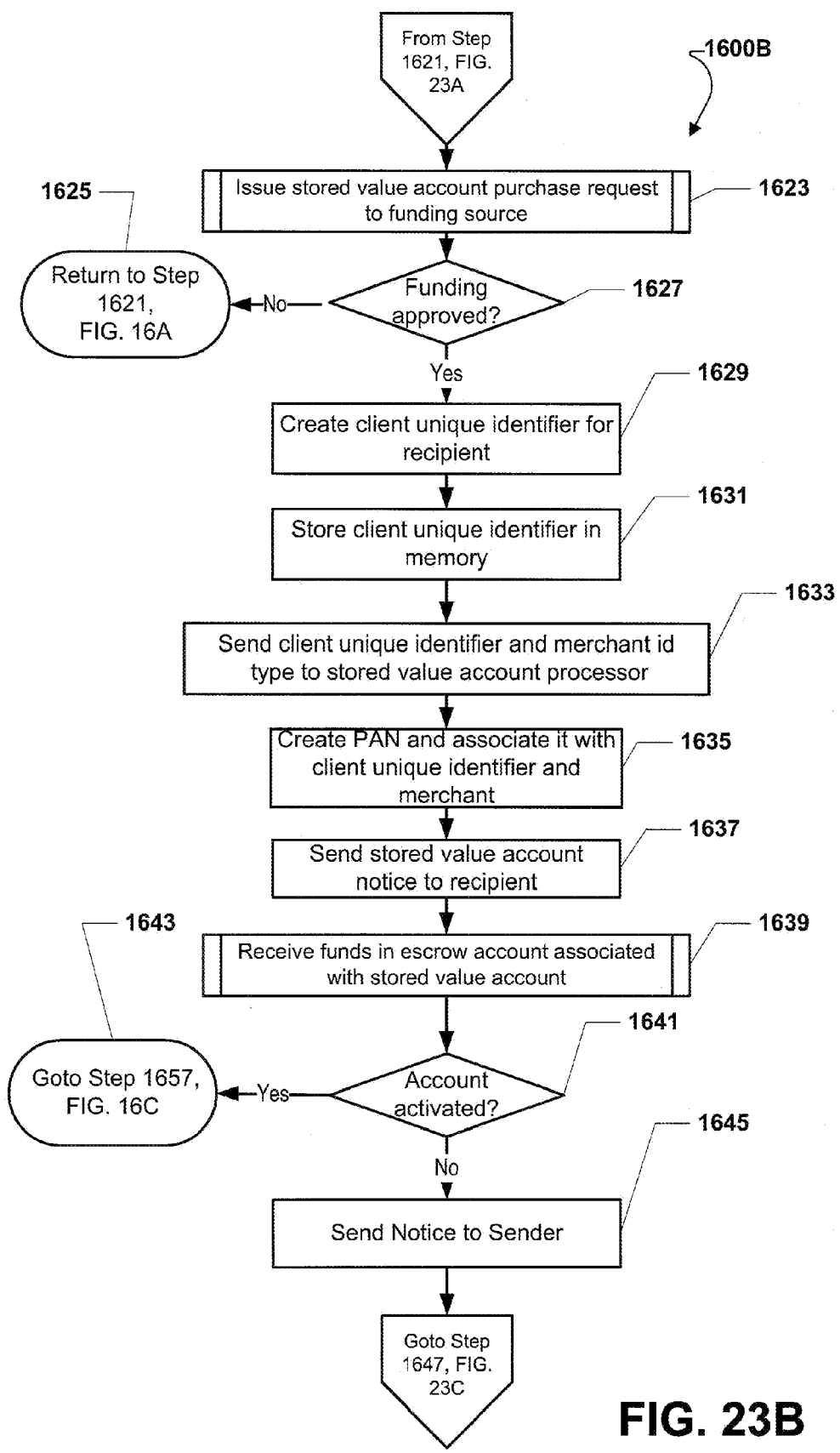

FIG. 23B is a second flowchart 1600B that is a continuation of the first flowchart 1600A illustrating the method 1600 for creating and managing a stored value account 142 with a client device 102. At block 1623, a routine or sub-method for the client device management server 106 issuing a stored value account purchase request to the sender funding source 118 is provided. This routine or sub-method at block 1623 provides the details on how funds are transferred between the funding account associated with the sender client device 102A and the client device management server 106. The routine or sub-method of block 1623 is discussed in further detail below in connection with FIG. 24. The stored value account 142 may be purchased by the sender client device 102A by using a credit card, a checking account, PAYPAL™ brand electronic payments, AMAZON™ brand electronic payments, GOOGLE™ Checkout brand payments, GREEN DOT™ electronic payments, REVOLUTION CARD™ brand card payments, and other like forms of payment.

After block 1623, in decision block 1627, the client device management server 106 determines if the funding provided by the sender client device 102A has been approved by its funding source 118. If the funding source 118 does not provide an approval for the purchase of the stored value account 142 by the sender client device 102A, then the process 1600 proceeds to transition oval 1625 (technically not a block—a transition oval) in which the method is returned to block 1621 of FIG. 23A.

If the funding source 118 provides an approval message to the client device management server 106, then the process 1600 proceeds to block 1629 in which the client device management server 106 creates the client unique identifier 155 for associating with the stored value account 142B as illustrated in FIG. 2. This stored value account 142B corresponds to the recipient client device 102B. Proceeding to block 1631, the client unique identifier 155 is stored in memory such as in memory 132 of the client device management server 106, as illustrated in FIG. 3.

Next, in block 1633, the client device management server 106 sends each of the client unique identifier 155, the amount of value purchased for the stored value account 142, and a merchant identifier associated with the stored value account 142 to the stored value account issuer server 108B. The merchant identifier may comprise an alphanumeric string.

At block 1635, the stored value account issuer server 108B creates the primary account number ("PAN") 165 as illustrated in FIG. 2 that is associated with the stored value account and other data received from the client device management server 106. If the stored value account 142 is unbranded, then it is assigned to an unbranded account 160. In the unbranded scenario, the stored value account issuer server 108B also does not create a PAN 165 and only associates the unbranded account 160 with the client unique identifier 155 and its corresponding value which was purchased by the sender client device 102A, as illustrated in FIG. 2.

Proceeding to block 1637, the client device management server 106 sends a notice to the recipient client device 102B. This notice may be delivered by a text message if the sender client device 102A only provided a mobile telephone number for the recipient client device 102B. Alternatively, this notice may be delivered by an e-mail message from the client device management server 106 if the sender client device 102A provided the e-mail address associated with the recipient client device 102B. This notice may take the format as illustrated in screen 600 of FIG. 6.

If the notice is delivered by an e-mail message, then this e-mail message may include a hypertext link comprising a universal resource locater ("URL") that directs a browser to a website that prompts the user of the recipient client device 102B to activate the stored value account 142. Similarly, if the notice is delivered by a text message to a mobile recipient client device 102B, then the notice may identify a sender of the virtual gift card account 142, what merchant 120 is associated with the virtual gift card account 142, and a URL hypertext link that may take the user to the activation website.

The website for activating the gifted stored value account 142 may include the following elements: the name of the user associated with the sender client device 102A, the name of a merchant 120 selected by the sender client device 102A, the value of the gifted stored value account 142, instructions for activating the stored value account 142 such as downloading software for a mobile client device 102 like as a mobile telephone, and frequently asked questions ("FAQs"). The FAQs may address common questions a recipient may have as to the authenticity of the stored value account 142 and/or redemption methods for the stored value account 142.

The activation website may include any of the personalizations that were selected by the sender client device 102A. For example, the activation website may include hypertext links to the audio or video recording selected by the sender client device 102A. The activation website may also display the text message selected by the sender client device 102A.

At block 1639, a routine or sub-method may be executed for receiving funds in the escrow account 136 of the client device management server 106 and which are associated with the stored value account 142 for the recipient client device 102B that is purchased. This routine may occur at the end of a business day under a credit card purchase model. However, this routine may be performed much earlier in the process 1600 under other funding models, such as a debit model in which the funding source 118 is a personal identification number ("PIN")-debit issuer for the client device 102B. Further details of this routine at block 1639 are described below in connection with FIG. 25.

Proceeding to decision block 1641, the client device management server 106 determines if the recipient client device 102B has activated the stored value account 142. Activation of the stored value account 142 generally means that an operator of the recipient client device 102B has become a subscriber of the mobile wallet system 114 that is maintained by the client device management server 106, and the recipient client device 102B has viewed the stored value account 142 through the mobile wallet system 114. If the recipient client device 102B is already a subscriber of the mobile wallet system 114, then activation may include a user of the recipient client device 102B viewing the stored value account 142 through the mobile wallet system 114.

Figure 23C:
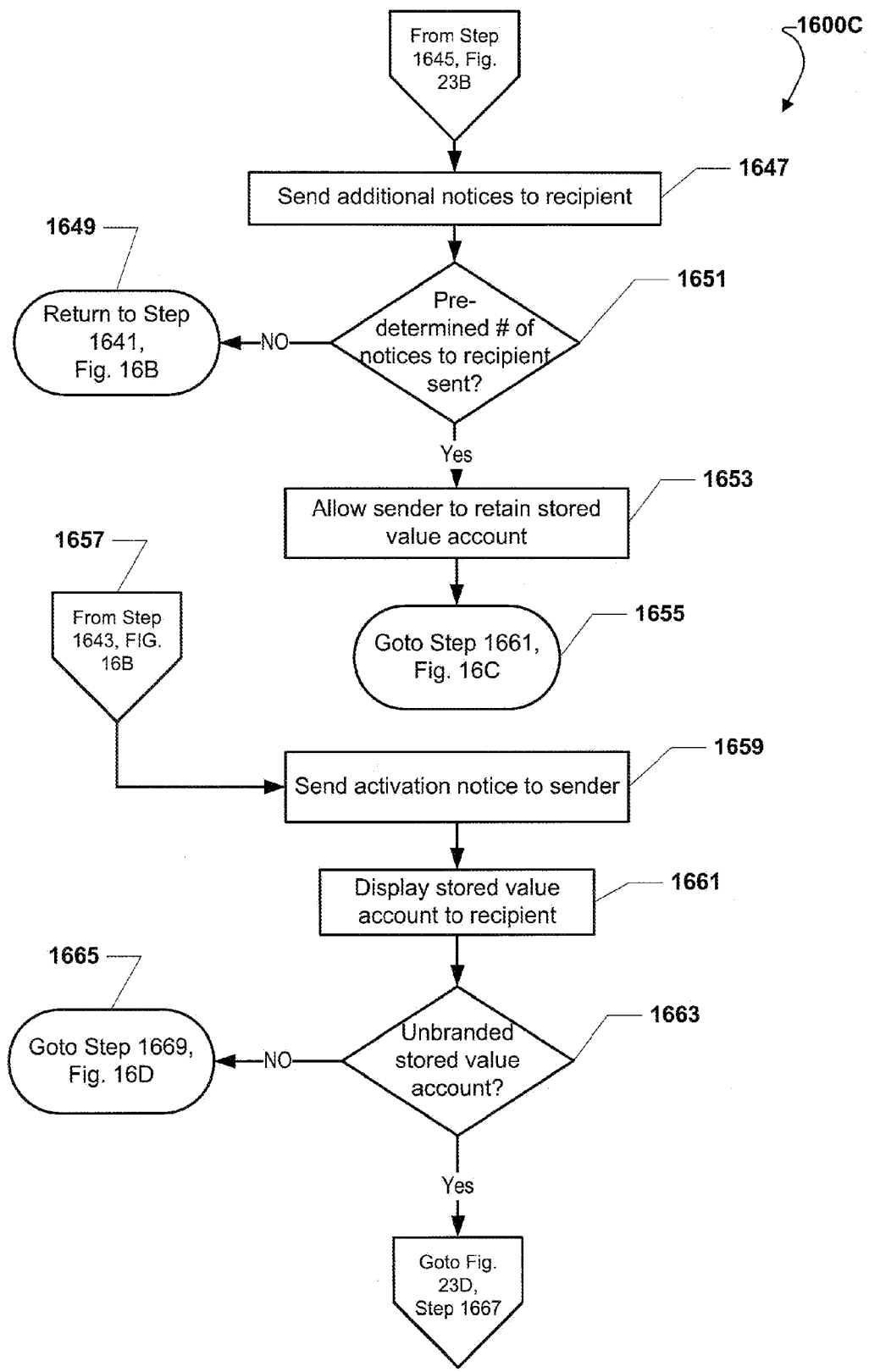

If the stored value account 142 is activated in decision block 1641, then the process 1600 proceeds to block 1643 transition oval in which the method is taken to step 1657 of FIG. 23C. If the stored value account 142 is not activated in decision block 1641, then the process 1600 proceeds to block 1645 in which the client device management server 106 sends a notice to the sender client device 102A to indicate that the stored value account 142 has not been activated by the recipient client device 102B. This notice to the sender client device 102A may also present an option for the sender client device 102A to resend a notice about the gifted stored value account 142 through another communication channel such as through an e-mail message or mobile telephone text message.

If the sender client device 102A decides to resend another notice to the recipient client device 102B, then the client device manager server 106 may set a predetermined amount of time in which the recipient client device 102B will need to respond to the subsequent notice. According to one exemplary embodiment, this predetermined amount of time set by the client device management server 106 may be 72 hours. However, other lengths of time are within the scope of the invention. At the expiration of the predetermined amount of time, additional notices may be sent to the sender client device 102A to indicate that the recipient client device 102B has not activated the gifted stored value account 142.

After block 1645, the process 1600 proceeds to block 1647 of FIG. 23C. FIG. 23C is a third flowchart 1600C that is a continuation of the second flowchart 1600B illustrating the method 1600 for creating and managing a stored value account with a client device. At block 1647, the client device management server 106 may send additional notices to the recipient client device 102B. At decision block 1651, if a predetermined number of notices have been sent to the recipient client device 102B and the recipient client device 102B has not activated the gifted stored value account 142, then the process 1600 may proceed to block 1653. At decision block 1651, if the predetermined number of notices have not been sent to the recipient client device 102B, then the process 1600 may proceed to block 1649 in which the method returns to decision block 1641 of FIG. 23B.

The client device manager server 106 may establish in decision block 1651 a predetermined number of notices which must be sent to a recipient client device 102B prior to allowing the sender client device 102A to have additional options with respect to handling the gifted stored value account 142. This predetermined number may be of any magnitude such as three or four, or any number. At block 1653, the sender client device 102A will be presented with an option to retain the purchased stored value account 142 for his or her benefit. After block 1653, the process 1600 proceeds to block 1655 in which the method proceeds to block 1661 of FIG. 23C.

At block 1659, the client device management server 106 may transmit an activation message to the sender client device 102A that the recipient client device 102B has activated the gifted stored value account 142. This activation message transmitted to the sender client device 102A may contain the following elements: a time date stamp, the merchant 120 associated with the stored value account 142, the recipient's name, the recipient's e-mail address, the purchased value for the stored value account 142, the transaction amount for the purchase of the stored value account 142, and an authorization code generated by the stored value account issuer server 108B.

Proceeding to block 1661, the client device management server 106 may display the stored value account 142 to the recipient client device 102B after the stored value account 142 has been activated at block 1641. For example, see FIG. 20 and screen 2000 that illustrate an activated stored value account 142. At decision block 1663, the client device management server 106 may display options to the recipient client device 102B for an unbranded stored value account 142.

Figure 23D:
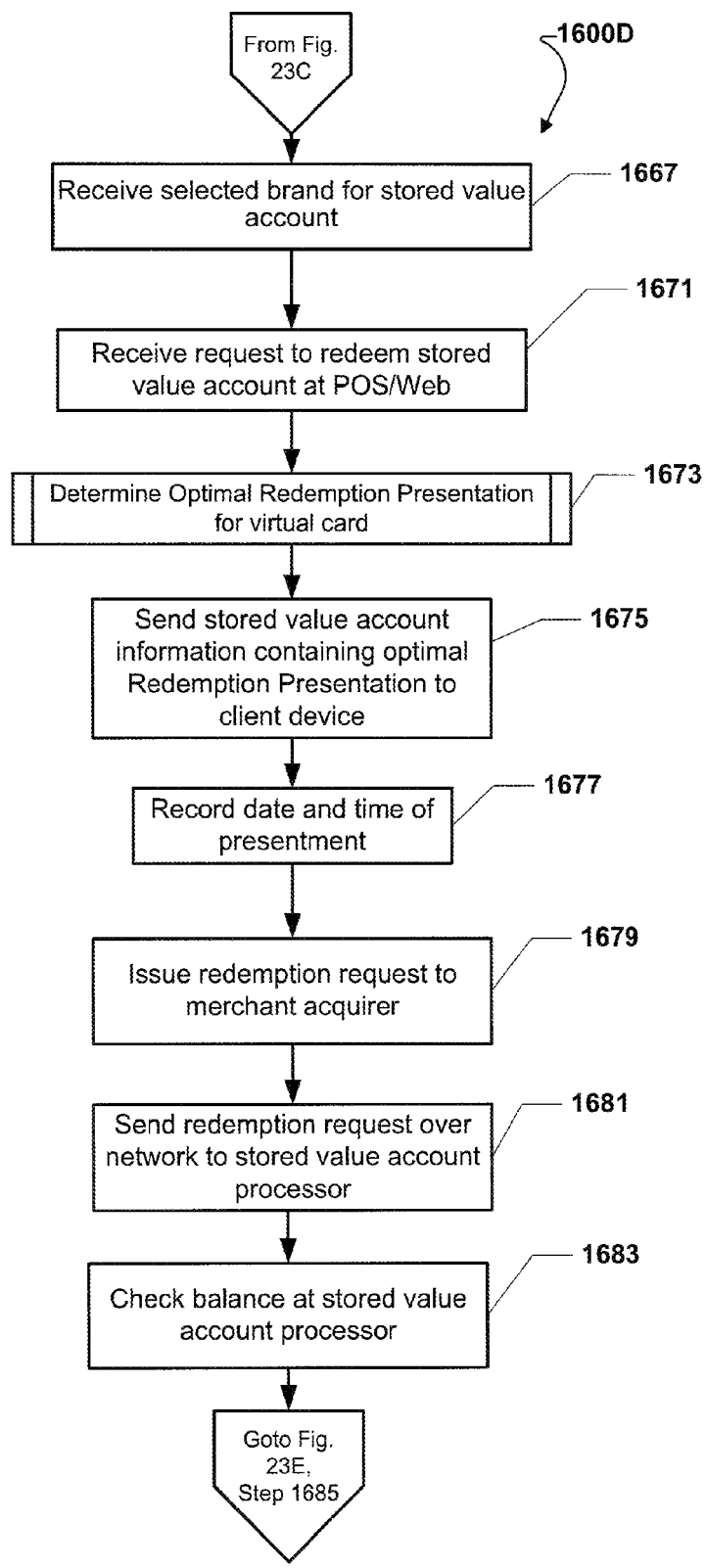

If the gifted stored value account 142 is branded meaning that it has a merchant 120 already associated with the account 142, then the process 1600 may proceed to decision block 1665 in which the method is redirected to decision block 1669 of FIG. 23D. If the gifted stored value account 142 is unbranded, meaning that the sender client device 102A did not choose a merchant 120 to be associated with the gifted stored value account 142, then the process 1600 may proceed to block 1667 of FIG. 23D described below.

FIG. 23D is a fourth flowchart 1600D that is a continuation of the third flowchart 1600C illustrating a method 1600 for creating and managing a stored value account 142 with a client device 102. At block 1667, the client device management server 106 may display a plurality of brands associated with merchants 120 that are available for selection by the recipient client device 102B for the unbranded stored value account 142. The client device management server 106 may generate a screen similar to the screen 1200 of FIG. 12 at block 1667. Also, at this block 1667, the client device management server 106 may receive the selection of the brand by the recipient client device 102B.

Proceeding to block 1671, the client device management server 106 may receive a request from the recipient client device 102B to redeem the value associated with the stored value account 142 in order to purchase goods or services. The recipient client device 102B may redeem the value of the stored value account 142 at a point-of-sale ("POS") terminal, on-line at a website, or using a telephone system.

At block 1673, a routine or sub-method may be executed for determining the optimal redemption presentation for a virtual token. The details of routine 1673 are discussed in connection with FIG. 26 described below. In this routine 1673, the mobile wallet system 134 determines if the client device 102 is a device being used for an on-line or e-commerce transaction or if the client device 102 is being used at a POS terminal in a location of a merchant 120. The mobile wallet system 134 can provide the preferred redemption presentation of a virtual token 702 when a stored value account 142 is being used in a transaction.

At block 1675, the client device management server 106 may transmit the stored value account information, that can include the optimal redemption presentation determined at block 1673, to the recipient client device 102B over the communications network 105. If the recipient client device 102B is a mobile telephone, then the client device management server 106 may transmit the data associated with screen 800 of FIG. 8. If the recipient client device 102B is a laptop or desktop computer, then the client device management server 106 may transmit instructions for entering the stored value account 142 into an e-commerce site, such as what card type to select on the e-commerce site as well as what to enter for any verification codes usually associated with a physical card or physical token.

Next, at block 1677, the client device management server 106 may record the date and time of the presentment of the stored value account 142 for redemption as requested by the sender client device 102B. At block 1679, the merchant 120 using its point-of-sale terminal or through its website may issue a redemption request corresponding to the stored value account 142 to the merchant acquirer 116B as illustrated in FIG. 1. Alternatively, in certain situations for a merchant 120 which does not use a merchant acquirer 116B, the redemption request may be sent over the communications network 105 that may comprise a sub-network within the communications network 105, like the DISCOVER™ brand credit card communications network. In this situation, block 1677 may be skipped when the merchant 120 communicates directly with the stored value account processor server 108A. This redemption request may comprise the sixteen digit PAN 165, the expiration date for the stored value account 142, and a verification number.

Proceeding to block 1681, the merchant acquirer 116B may send the redemption request over the communications network 105 to the stored value account processor server 108A. As noted previously, the merchant acquirer 116 be may have access to specific proprietary sub-networks within the communications network 105 such as the VISA™ credit card network, the MASTERCARD™ card network, the DISCOVER™ credit card network, the AMERICAN EXPRESS™ credit card network, and other similar charge card proprietary networks.

Subsequently, at block 1683, the redemption request is received by the stored value account processor server 108A from the communications network 105. Also at block 1683, the stored value account processor server 108A will check the balance of the stored value account 142 associated with the PAN 165 that corresponds with the sender client device 102B. At this stage the stored value account processor server 108A is determining if the value associated with the stored value account 142 is greater than or equal to the redemption request. After block 1683, the process 1600 proceeds to block 1685 FIG. 23E.

Figure 23E:
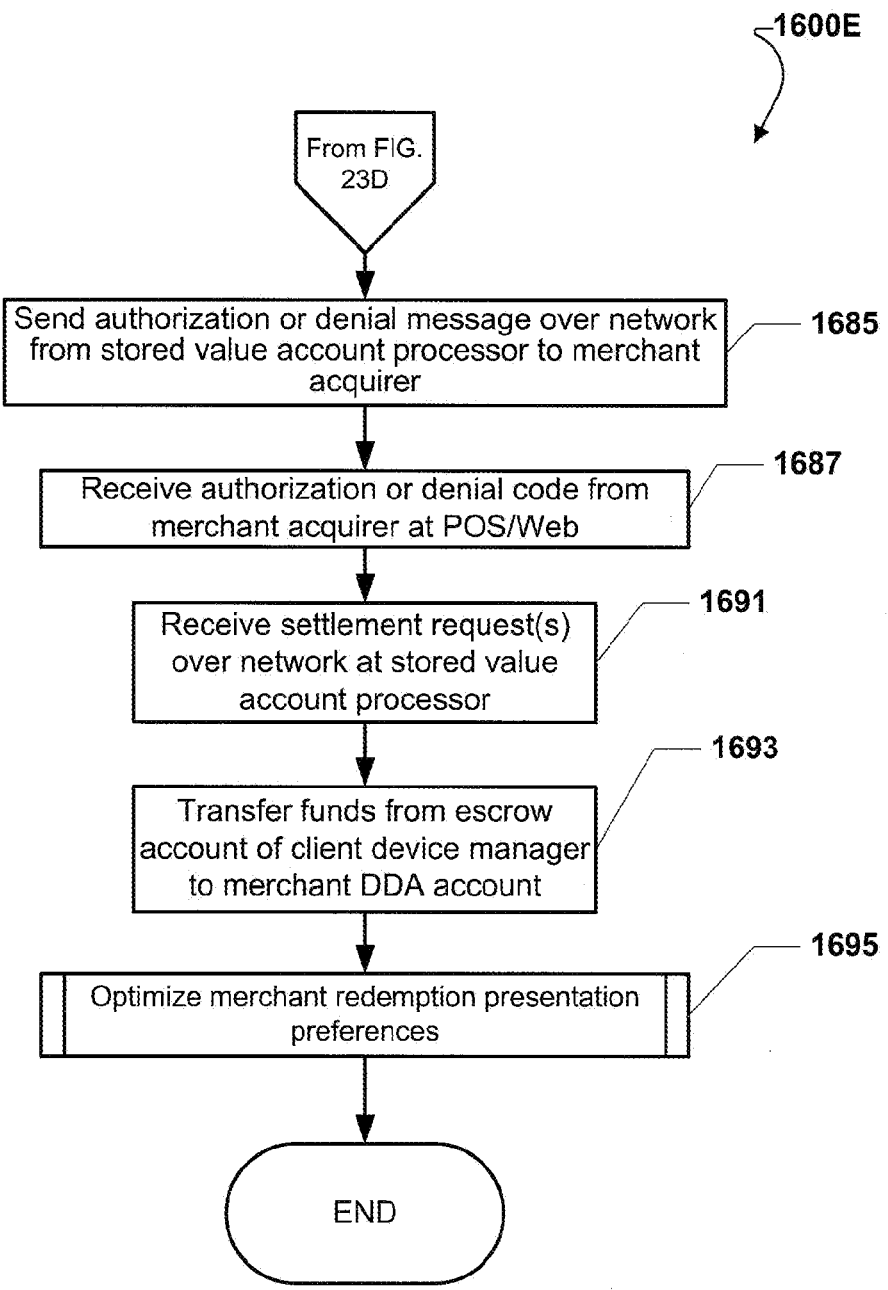

FIG. 23E is a fifth flowchart 1600E that is a continuation of the fourth flowchart 1600D illustrating a method 1600 for creating and managing a stored value account 142 with a client device 102. If at block 1683 in FIG. 23D, the stored value account processor server 108A determines that the value associated with the stored value account 142 is greater than or equal to the redemption request, then the stored value account processor server 108A will generate and send an authorization message over the communications network 105 to the merchant acquirer 116B at block 1685. However, if the stored value account processor server 108A determines at block 1683 that the value associated with the stored value account is less than the redemption request, then the stored value account processor server 108A will generate and send a denial message over the communications network 105 to the merchant acquirer 116B at block 1685.

Proceeding to block 1687, the point-of-sale terminal, e-commerce website, or phone system will receive the authorization code or denial message from the communications network 105. Next, at block 1689, if an authorization code was received, then the point-of-sale terminal, e-commerce website, or phone system will allow the purchase of the good(s) and/or service(s) based on the redemption request. If the point-of-sale terminal, e-commerce website, or phone system receives a denial message from the merchant acquirer 116B, then the user of the recipient client device 102B will not be permitted to purchase the good(s) and/or service(s).

At block 1691, usually at the end of a business day such as in the evening hours, a merchant 120 will settle their daily purchases and send a settlement request to the merchant acquirer 116B. The merchant acquirer 116B will generally pass on this settlement request over the communications network 105 to the stored value account processor server 108A.

Next at block 1693, the stored value account processor server 108A will transfer funds associated with any stored value account purchases from the client device management escrow account 136 to the merchant's demand deposit account 121. At block 1695, a routine or sub-method may be executed for optimizing redemption presentations of virtual tokens 702 based on use by each client device 102 with a particular merchant 120. In this routine which is described in further detail in connection with FIG. 27, the mobile wallet system 134 can collect and refine data for redemption presentations that have been provided to a particular merchant 120. The process 1600 then ends.

Figure 24:
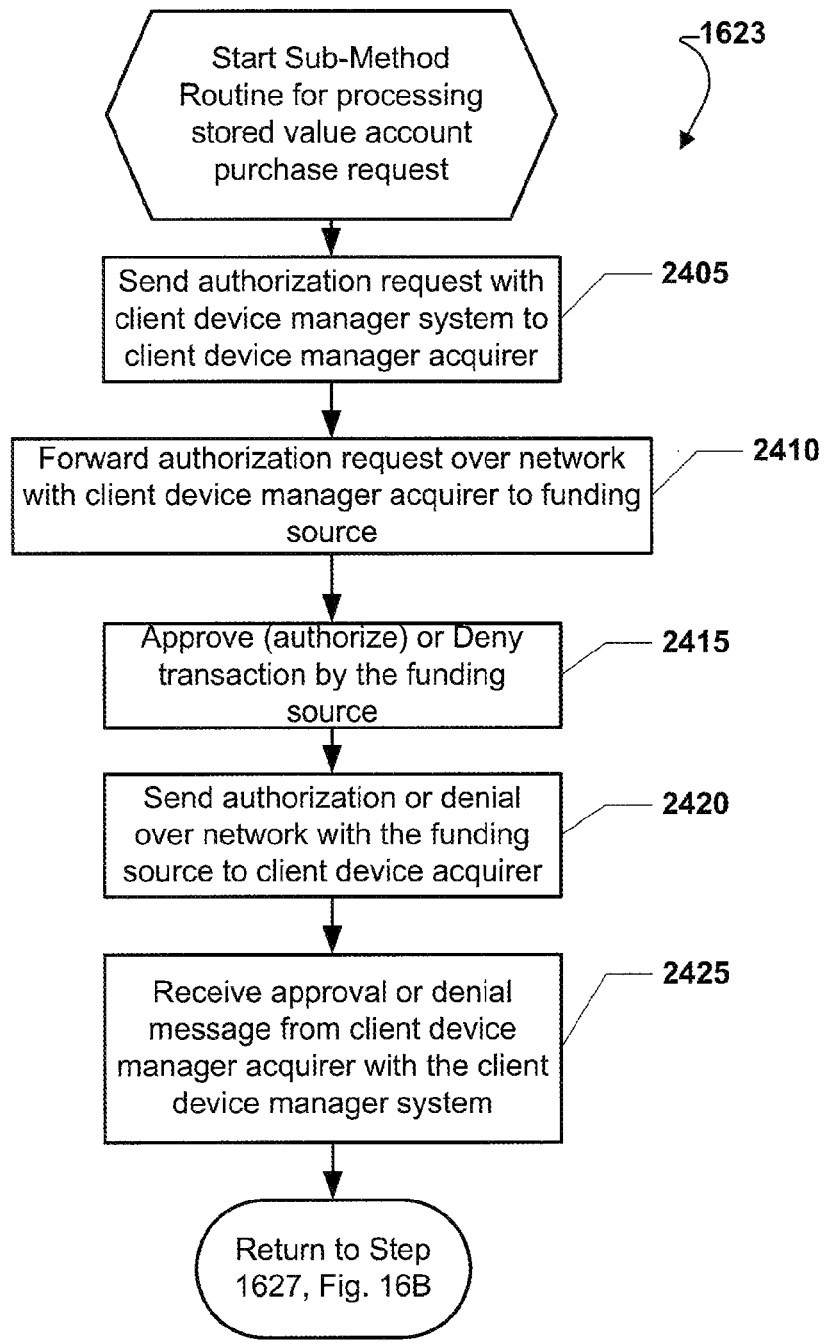
FIG. 24 is a flowchart illustrating a routine or a sub-method of FIG. 23 for processing a stored value account purchase request.

FIG. 24 is a flowchart illustrating a routine or a sub-method 1623 of FIG. 23 for processing a stored value account purchase request. Commencing at block 2405, the client device management server 106 receives a purchase request from the sender client device 102A for purchasing the selected stored value account 142. At block 2405, the client device management server 106 may send an authorization request to its client device management ("CDM") acquirer 116A as illustrated in FIG. 1. Next, at block 2410, the client device management ("CDM") acquirer 116A may forward the authorization request over the communications network 105 to the sender funding source 118. Like the merchant acquirer 116B noted above, the CDM acquirer 116B be may have access to specific proprietary sub-networks within the communications network 105 such as such as the VISA™ credit card network, the MASTERCARD™ card network, the DISCOVER™ credit card network, the AMERICAN EXPRESS™ credit card network, and other similar charge card proprietary networks.

At block 2415, the sender funding source 118 may receive the authorization or purchase request from the CDM acquirer 116A. If there are sufficient funding sources, meaning that an account associated with the sender client device 116A has available funds which are equal or greater than the value listed in the purchase request, then the sender funding source 118 may improve the authorization request or stored value account purchase request.

The sender funding source 118 may comprise any one of a plurality of financial institution types. For example, the sender funding source 118 may include, but is not limited to, a credit card issuer (that may support proprietary credit card networks such as the VISA™ credit card network, the MASTERCARD™ card network, the DISCOVER™ credit card network, the AMERICAN EXPRESS™ credit card network, and other similar charge card proprietary networks), a signature debit issuer, and a pin-debit issuer. One of ordinary skill the art recognizes that depending upon the issuer and corresponding network that is supported, an acquirer such as the CDM acquirer 116A may or may not be needed. Similarly, one of ordinary skill the art recognizes that under a debit model, settlement or transfer of funds from the funding source 118 occurs almost immediately, which is contrary to the end of the day settlement processes that generally occur with credit card type transactions.

At block 2420, assuming that sufficient funds are available at the funding source 118, the funding source 118 may send an authorization for the purchase request or authorization request over the communications network 105 to the CDM acquirer 116A. If sufficient funds are not available at the funding source 118, then the funding source 118 may send a denial message over the communications network 105. At block 2425, the client device management server 106 may receive an approval message from CDM acquirer 116A if sufficient funds were available at the funding source 118. Alternatively, at block 2425, the client device management server 106 could receive a denial message from the CDM acquirer 116A. The process 1600 then returns to decision block 1627 in FIG. 23B.

Figure 25:
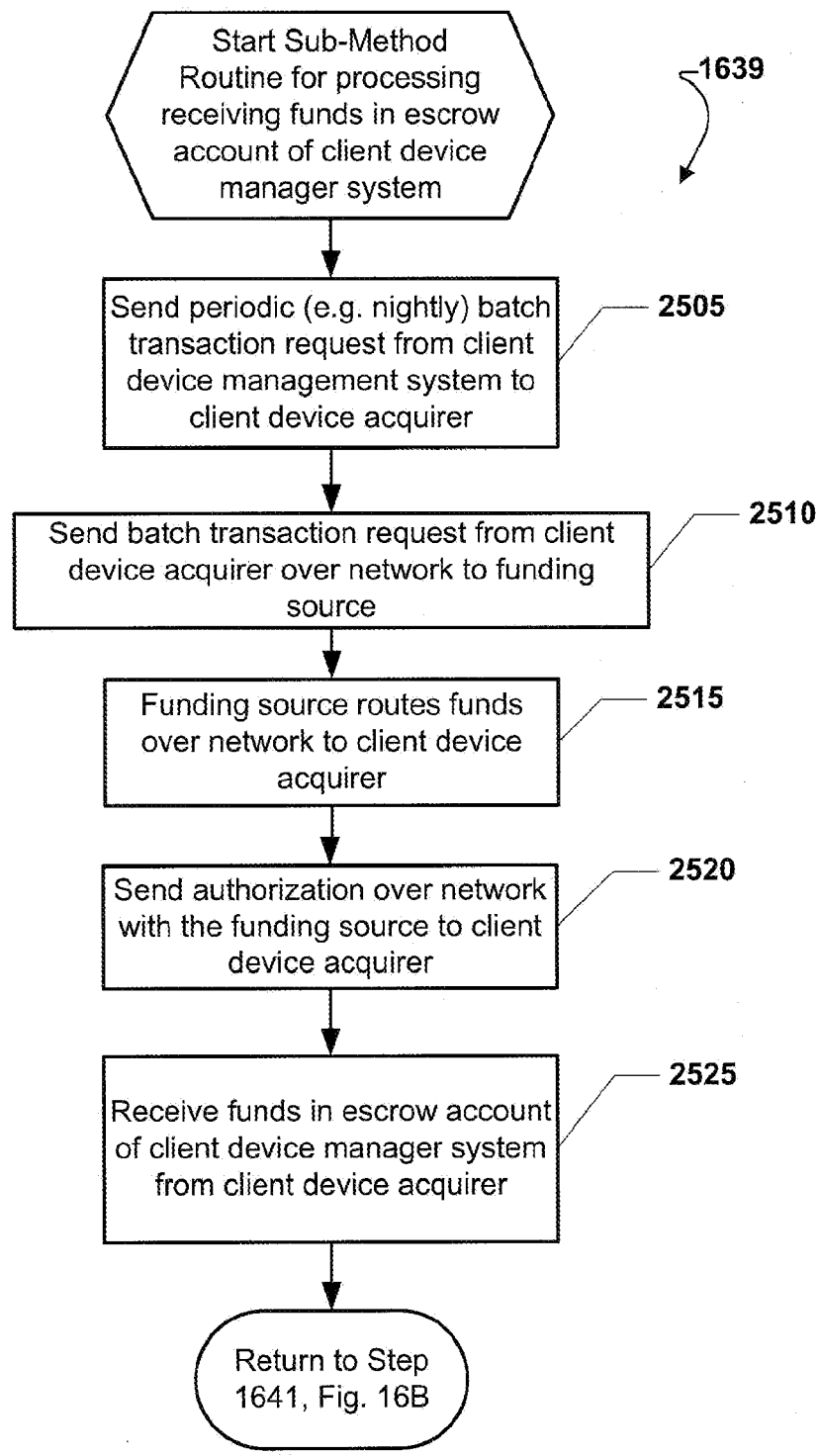
FIG. 25 is a flowchart illustrating a routine or a sub-method of FIG. 23 for processing and receiving funds in an escrow account of a client device management server.

Referring now to FIG. 25, this figure is a flowchart illustrating a routine or a sub-method 1639 of FIG. 23 for processing receiving funds in an escrow account 136 of a client device management server 106. As noted previously, the settlement of funds between the funding source 118 and the escrow account 136 of the client device management server 106 will be dependent upon the type of funding source 118 that is associated or being used by the sender client device 102A.

If the funding source 118 comprises some form of debit system, then many of these steps illustrated in FIG. 25 may be changed or deleted as is understood by one of ordinary skill in the art. For the exemplary embodiment described in connection with FIG. 25, it is assumed that the funding source 118 comprises some form of a credit card model that uses proprietary networks within the communications network 105 and which may require the client device management acquirer 116A.

At block 2505, the client device management server 106 sends a periodic, typically a nightly, batch transaction request to the CDM acquirer 116A. The CDM acquirer 116A relays the batch transaction request over the communications network 105 at block 2510. At block 2515, the sender funding source 118, which may comprise a credit card issuer, may route the funds, such as communicating a credit to a merchant account corresponding to the batch request to the CDM acquirer 116A over the communications network 105.

The sender funding source 118, at block 2520, may also send an authorization over the communications network to the CDM acquirer 116A that authorizes the CDM acquirer 116A to transfer the funds from the CDM acquirer 116A to the escrow account 136 of the client device management server 106. At block 2525, the escrow account 136 may receive the funds from the CDM acquirer 116A. As noted previously, this transfer of funds between the CDM acquirer 116A and the escrow account 136 usually takes place at the end of the business day under a credit card model. This means that this subroutine or sub-method 1639 may actually occur much later in the overall process 1600 than is described above. Meanwhile, if the subroutine or sub-method 1639 operates under a debit model, then the funds may be transferred immediately between accounts. The process 1600 then returns to decision block 1641 of FIG. 23B.

Figure 26:
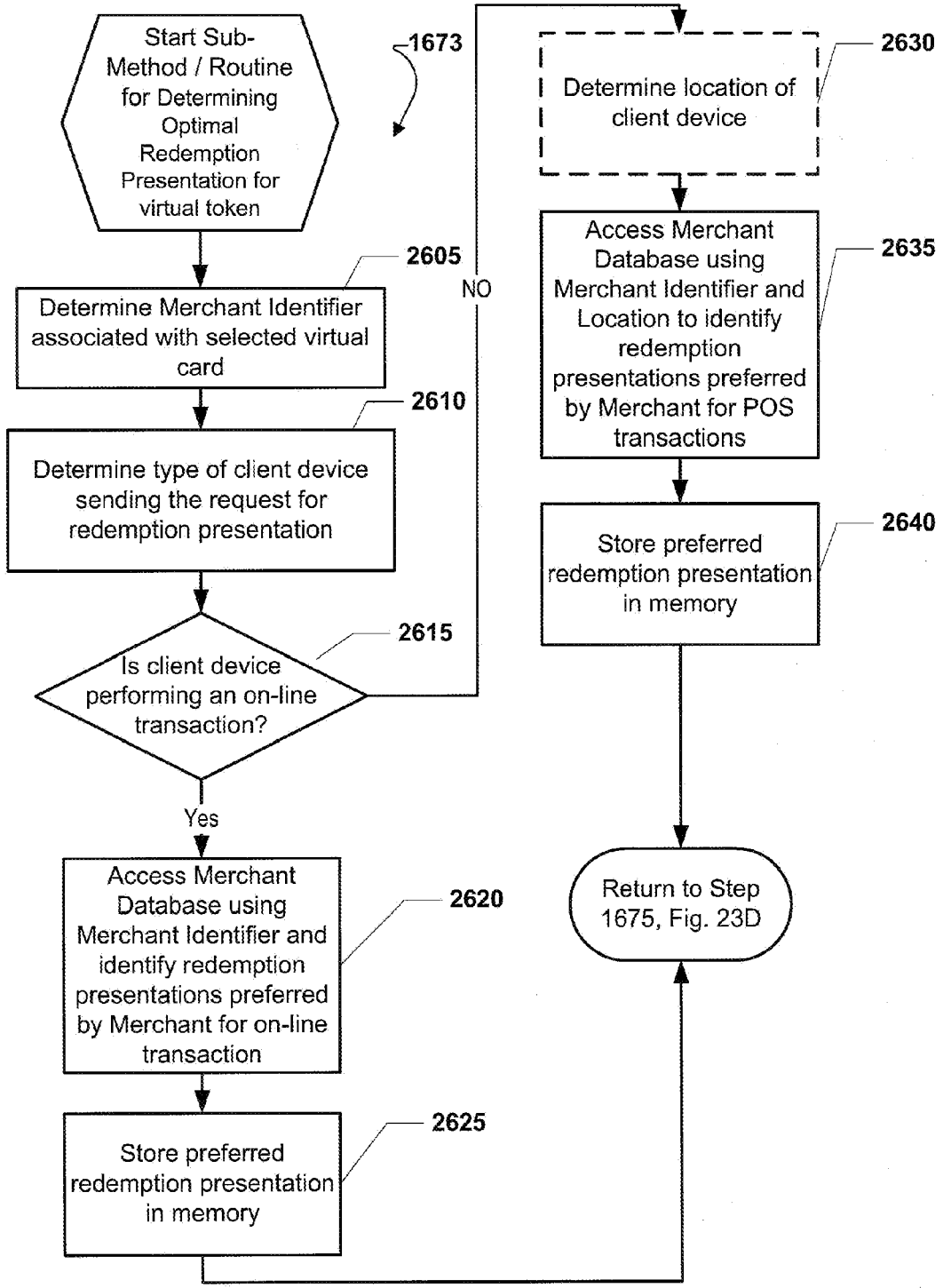
FIG. 26 is a flowchart illustrating a routine or a sub-method of FIG. 23 for determining an optimal presentation for a virtual token.

Referring now to FIG. 26, this figure is a flowchart illustrating a routine or a sub-method 1673 of FIG. 23 for determining an optimal redemption presentation for a virtual token. The first step in routine 1673 starts in block 2605. In block 2605, the mobile wallet system 134 of the client device management server 106 determines the merchant identifier 170 that is associated with the virtual token 702 that has been selected for redemption presentation to complete a transaction. Next, at block 2610, the mobile wallet system 134 determines the type of client device 102 sending the request for the redemption presentation. In this step, the mobile wallet system 134 determines if the client device 102 is a mobile, handheld device or if it is a desktop or laptop computer.

At decision block 2615, the mobile wallet system 134 determines if the client device 102 is performing an on-line transaction. If the mobile wallet system 134 determines that the client device 102 is performing an on-line transaction, the process proceeds to block 2620. If the mobile wallet system 134 determines that the client device 102 is not performing an on-line transaction, the process proceeds to optional block 2630.

At block 2620, the mobile wallet system 134 may access a merchant database 201A such as illustrated in FIG. 2A using the merchant identifier 170 and identify redemption presentations 215 preferred by a merchant 120 for on-line transactions. Next, block 2625, these redemption presentations preferred by a merchant 120 may be stored in memory. The process then returns to step 1675 of FIG. 23D.

At optional block 2630, the mobile wallet system 134 may determine the location of the client device 102 by accessing geographical coordinates supplied to the client device 102 through GPS signals. Block 2630 may be optional since the steps of this block 2630 are typically used only in conjunction with the exemplary embodiment of the database 201B illustrated in FIG. 2B in which individual stores of a merchant 120 are tracked with store identifiers 207. If the exemplary database 201B of FIG. 2B is not used by the mobile wallet system 134, then block 2630 may be omitted.

Next, in block 2635, the mobile wallet system 134 may access the merchant database 201A or 201B using merchant identifiers 172 identify redemption presentations preferred by merchants 120 for POS transactions when the client device 102 is a handheld unit. If the second merchant database 201B is being used by the mobile wallet system 134, then the mobile wallet system 134 can use the geographical coordinates of the client device 102 to match up with the appropriate store identifier 207 as illustrated in FIG. 2B.

Next, in block 2640, the preferred redemption presentation is stored in memory. The process then returns to step 1675 of FIG. 23D.

Figure 27:
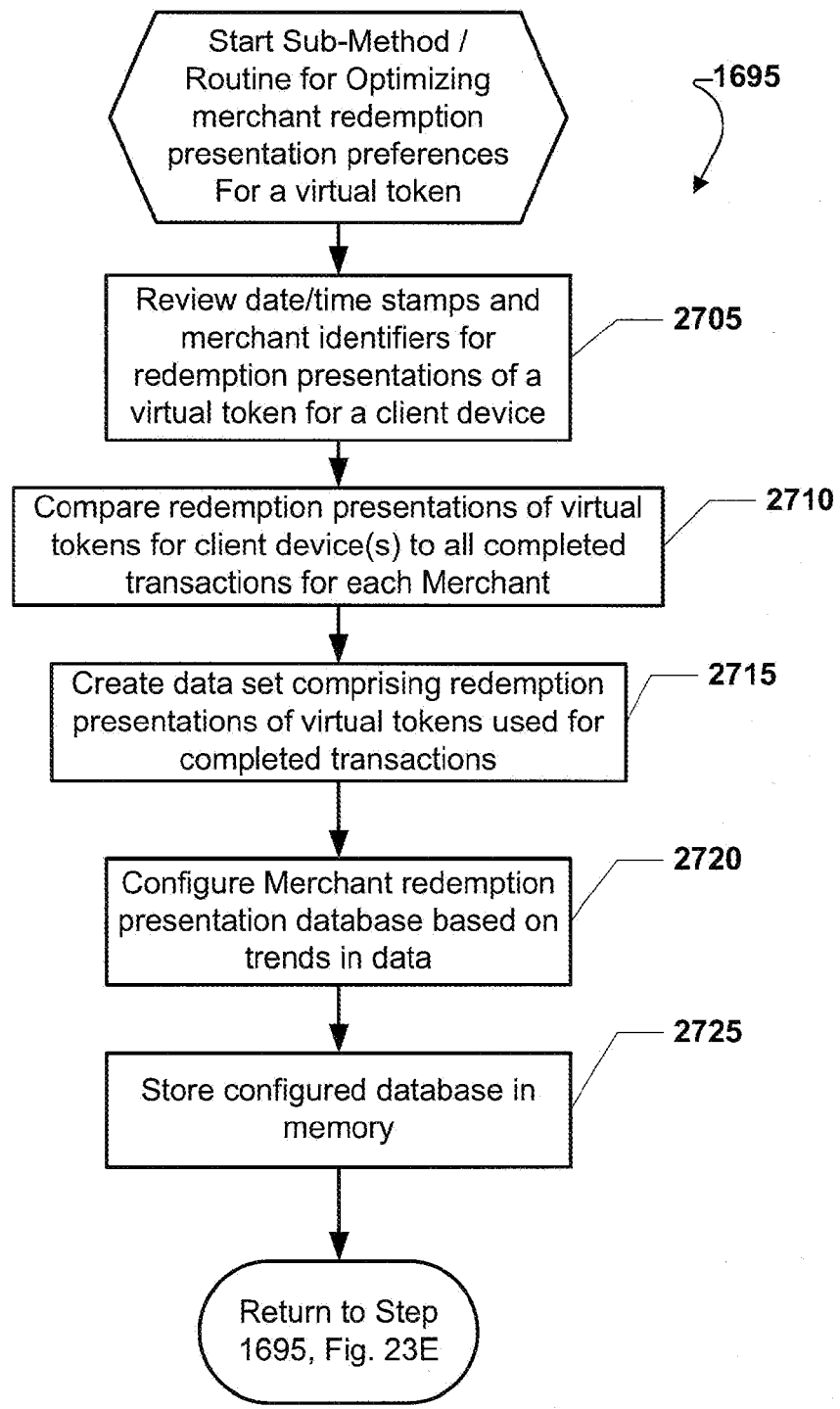
FIG. 27 is a flowchart illustrating a routine or a sub-method of FIG. 23 for optimizing merchant redemption presentation preferences for virtual tokens.

FIG. 27 is a flowchart illustrating a routine or a sub-method 1695 of FIG. 23 for optimizing merchant redemption presentation preferences of merchants 120 for virtual tokens. Block 2705 is the first step of routine 1695. At block 2705, the mobile wallet system 134 may review the date and time stamps as well as merchant identifiers 170 associated with redemption presentations of virtual tokens 702 requested by client devices for a particular merchant 120. Next, at block 2710, the mobile wallet system 134 of the client device management server 106 may compare the redemption presentations of virtual tokens 702 of client devices 102 to all completed transactions for a particular merchant 120.

Next, at block 2715, the mobile wallet system 134 may create a data set comprising redemption presentations for virtual token 702 that have been used for completing transactions with a particular merchant 120. In block 2720, the mobile wallet system 134 may configure the merchant redemption databases 201A, 201B for virtual token 702 based on the trends in data uncovered in block 2715. Next, at block 2725, the configured database 201A, 201B can be stored in memory. The process then returns to step 1695 of FIG. 23E.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example.

Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Although selected aspects have been illustrated and described in detail, it will be understood that various substitutions and alterations may be made therein without departing from the spirit and scope of the present invention, as defined by the following claims.

What is claimed is:

1. A method for determining an appropriate redemption presentation for a virtual token associated with a stored value account, the method comprising:
- receiving by a client device management server a request for determining a format in which a virtual token for accessing the stored value account is to be displayed on a client device when making a purchase using the virtual token by accessing the stored value account;
- obtaining by the client device management server a merchant identifier associated with the request;
- determining by the client device management server if the request is for a transaction with a point-of-sale terminal,
- if the request is for a transaction with a point-of-sale terminal, then searching by the client device management server a database using the merchant identifier to determine, from one or more redemption presentations, a preferred redemption presentation preferred by a merchant involved in the transaction, the preferred redemption presentation defining the format in which the virtual token for accessing the stored value account is to be displayed on the client device and presented to the point-of-sale terminal for the transaction using the virtual token by accessing the stored value account, the database storing one or more redemption presentations for each virtual token;
- transmitting by the client device management server the preferred redemption presentation over a computer network, the preferred redemption presentation specifying to the client device, in response to the request, the format in which the virtual token for accessing the stored value account is to be displayed on the client device and presented to the point-of-sale terminal for the transaction; and
- generating and displaying the format on the client device for presenting to the point-of-sale terminal for the transaction.

2. The method of claim 1, further comprising:
- determining if the request originates from a client device comprising a mobile computing device or a stationary computing device.

3. The method of claim 2, wherein the mobile computing device comprises a hand-held computer.

4. The method of claim 2, wherein the stationary computing device comprises at least one of a laptop and desk top computer.

5. The method of claim 1, wherein the virtual token is associated with a stored value account.

6. The method of claim 5, wherein the stored value account comprises at least one of a gift card account, a payroll card account, a government benefits card account, a prepaid debit card account, and a telephone card account.

7. The method of claim 1, further comprising:
- determining geographical coordinates of the client device.

8. The method of claim 7, further comprising:
- using the geographical coordinates to determine the preferred redemption presentation.

9. The method of claim 1, wherein the client device comprises: one of a mobile hand-held device, a desk top computer, and a laptop computer.

10. The method of claim 9, wherein the mobile hand-held device comprises:
- a wireless mobile telephone.

11. The method of claim 1, further comprising:
- comparing redemption presentations for virtual tokens displayed on client devices against completed transactions posted by a merchant.

12. The method of claim 11, further comprising:
- creating a data set comprising redemption presentations used for completed transactions.

13. The method of claim 12, further comprising:
- optimizing a database of redemption presentations for merchants based on trends detected in the data set.

14. A computer system for determining an appropriate redemption presentation for a virtual token associated with a stored value account, the system comprising:
- a client device configured to display a format for presenting to the point-of-sale terminal for the transaction;
- a client device management server processor configured to:
  - receive a request for determining the format in which a virtual token for accessing the stored value account is to be displayed on the client device when making a purchase using the virtual token by accessing the stored value account;
  - obtain a merchant identifier associated with the request;
  - determine if the request is for a transaction with a point-of-sale terminal;
  - search a database using the merchant identifier to determine, from one or more redemption presentations, a preferred redemption presentation preferred by a merchant involved in the transaction if the request is for a transaction with a point-of-sale terminal, the preferred redemption presentation defining the format in which the virtual token for accessing the stored value account is to be displayed on the client device and presented to the point-of-sale terminal for the transaction using the virtual token by accessing the stored value account, the database storing one or more redemption presentations for each virtual token;
  - transmit the preferred redemption presentation over a computer network, the preferred redemption presentation specifying to the client device, in response to the request, the format in which the virtual token for accessing the stored value account is to be displayed on the client device; and
- the client device configured to generate the display format for presenting to the point-of-sale terminal for the transaction.

15. The system of claim 14, wherein the processor is further operable to:
- determine if the request originates from a client device comprising a mobile computing device or a stationary computing device.

16. The system of claim 15, wherein the mobile computing device comprises a hand-held computer.

17. The system of claim 15, wherein the stationary computing device comprises at least one of a laptop and desk top computer.

18. The system of claim 14, wherein the virtual token is associated with a stored value account.

19. The system of claim 18, wherein the stored value account comprises at least one of a gift card account, a payroll card account, a government benefits card account, a prepaid debit card account, and a telephone card account.

20. The system of claim 14, wherein the processor is further operable to:
   determine geographical coordinates of the client device.

21. The system of claim 20, wherein the processor is further operable to:
   use the geographical coordinates to determine the preferred redemption presentation.

22. The system of claim 14, wherein the client device comprises:
   one of a mobile hand-held device, a desk top computer, and a laptop computer.

23. The system of claim 22, wherein the mobile hand-held device comprises:
   a wireless mobile telephone.

24. The system of claim 14, wherein the processor is further operable to:
   compare redemption presentations for virtual tokens displayed on client devices against completed transactions posted by a merchant.

25. The system of claim 24, wherein the processor is further operable to:
   create a data set comprising redemption presentations used for completed transactions.

26. The system of claim 25, wherein the processor is further operable to:
   optimize a database of redemption presentations for merchants based on trends detected in the data set.

27. A computer system for determining an appropriate redemption presentation for a virtual token associated with a stored value account, the system comprising:
   a client device configured to display a format for presenting to the point-of-sale terminal for the transaction;
   client device management server means for receiving a request for determining the format in which a virtual token for accessing the stored value account is to be displayed on the client device when making a purchase using the virtual token by accessing the stored value account;
   client device management server means for obtaining a merchant identifier associated with the request;
   client device management server means for determining if the request is for a transaction with a point-of-sale terminal;
   client device management server means for searching a database using the merchant identifier to determine, from one or more redemption presentations, a preferred redemption presentation preferred by a merchant involved in the transaction if the request is for a transaction with a point-of-sale terminal, the preferred redemption presentation defining the format in which the virtual token for accessing the stored value account is to be displayed on the client device and presented to the point-of-sale terminal for the transaction using the virtual token by accessing the stored value account, the database storing one or more redemption presentations for each virtual token;
   client device management server means for transmitting the preferred redemption presentation over a computer network, the preferred redemption presentation specifying to the client device, in response to the request, the format in which the virtual token for accessing the stored value account, is to be displayed on the client device and presented to the point-of-sale terminal for the transaction; and
   the client device configured to generate the display format for presenting to the point-of-sale terminal for the transaction.

28. The system of claim 18, wherein the system further comprises:
   means for determining if the request originates from a client device comprising a mobile computing device or a stationary computing device.

29. The system of claim 18, wherein the virtual token is associated with a stored value account.

30. The system of claim 29, wherein the stored value account comprises at least one of a gift card account, a payroll card account, a government benefits card account, a prepaid debit card account, and a telephone card account.

31. The system of claim 18, wherein the system further comprises:
   means for determining geographical coordinates of the client device.

32. The system of claim 31, wherein the system further comprises:
   means for using the geographical coordinates determine the preferred redemption presentation.

33. The system of claim 32, wherein the system further comprises:
   means for comparing redemption presentations for virtual tokens displayed on client devices against completed transactions posted by a merchant.

34. The system of claim 33, wherein the system further comprises:
   means for creating a data set comprising redemption presentations used for completed transactions.

35. The system of claim 34, wherein the system further comprises:
   optimizing a database of redemption presentations for merchants based on trends detected in the data set.

* * * * *